(12) United States Patent
Ohtani et al.

(10) Patent No.: US 11,660,545 B2
(45) Date of Patent: May 30, 2023

(54) STORAGE MEDIUM, INFORMATION PROCESSING APPARATUS, INFORMATION PROCESSING SYSTEM AND INFORMATION PROCESSING METHOD

(71) Applicant: NINTENDO CO., LTD., Kyoto (JP)

(72) Inventors: Keisuke Ohtani, Kyoto (JP); Tetsuro Matsuzaki, Kyoto (JP); Toshitaka Muramatsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 431 days.

(21) Appl. No.: 16/937,982

(22) Filed: Jul. 24, 2020

(65) Prior Publication Data

US 2021/0031113 A1 Feb. 4, 2021

(30) Foreign Application Priority Data

Jul. 31, 2019 (JP) .............................. JP2019-140613

(51) Int. Cl.
*A63F 13/822* (2014.01)
*A63F 13/44* (2014.01)
*A63F 13/5375* (2014.01)
*A63F 13/58* (2014.01)

(52) U.S. Cl.
CPC ............ *A63F 13/822* (2014.09); *A63F 13/44* (2014.09); *A63F 13/5375* (2014.09); *A63F 13/58* (2014.09); *A63F 2300/305* (2013.01); *A63F 2300/638* (2013.01); *A63F 2300/65* (2013.01); *A63F 2300/807* (2013.01)

(58) Field of Classification Search
CPC .... A63F 13/822; A63F 13/44; A63F 13/5375; A63F 13/58; A63F 2300/305; A63F 2300/638; A63F 2300/65
See application file for complete search history.

(56) References Cited

U.S. PATENT DOCUMENTS

| | | | |
|---|---|---|---|
| 2005/0164794 A1* | 7/2005 | Tahara | A63F 13/426 463/43 |
| 2010/0311503 A1* | 12/2010 | McMain | A63F 13/537 463/40 |
| 2020/0038755 A1* | 2/2020 | Kojima | G06F 9/54 |

FOREIGN PATENT DOCUMENTS

JP 2013-126462 6/2013

\* cited by examiner

*Primary Examiner* — Thomas H Henry
(74) *Attorney, Agent, or Firm* — Nixon & Vanderhye PC

(57) ABSTRACT

A game apparatus that functions as a non-limiting example information processing apparatus includes a CPU. If execution of an auto-play game is instructed, the CPU makes, from a start to an end of the auto-play game, cause a plurality of player characters, i.e., available characters used by a player and a plurality of enemy characters to play battles with each other at predetermined time intervals. For example, in halfway until the auto-play game is cleared or rendered as a game over, the player sets the available characters or sets arrangement of the available characters by referring to results of battles at every predetermined time intervals, thereby to start the auto-play game again. That is, the available character to be played against the enemy character is re-set.

18 Claims, 17 Drawing Sheets

ENEMY CHARACTER IDENTIFICATION SCREEN
350

ENEMY CHARACTER IDENTIFIED!

CHARACTER M

352

ENEMY CHARACTER IDENTIFICATION SCREEN
350

ENEMY CHARACTER IDENTIFIED!

CHARACTER M

352

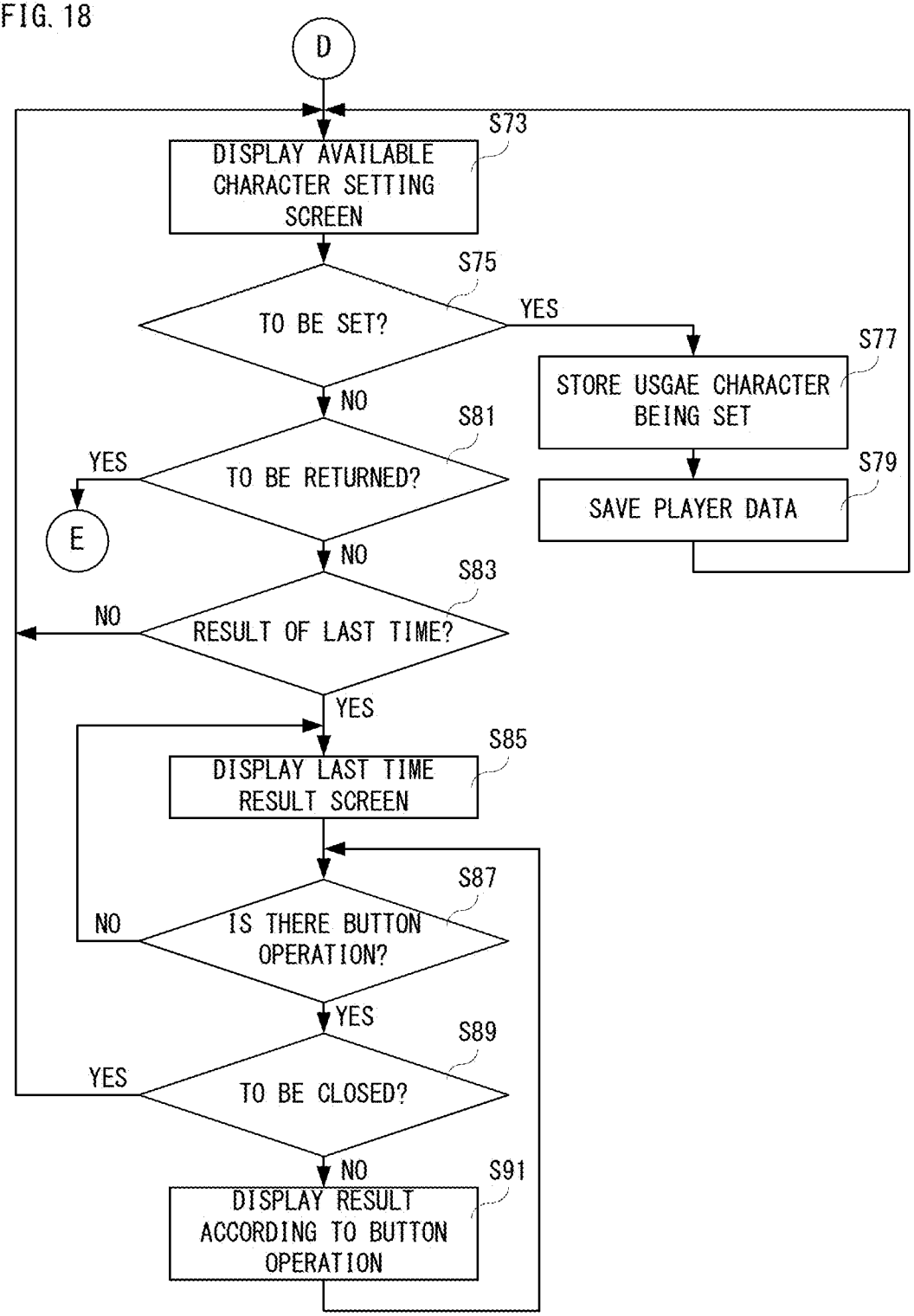

STORAGE MEDIUM, INFORMATION PROCESSING APPARATUS, INFORMATION PROCESSING SYSTEM AND INFORMATION PROCESSING METHOD

CROSS REFERENCE OF RELATED APPLICATION

The disclosure of Japanese patent application No. 2019-140613 filed on Jul. 31, 2019 is incorporated by reference.

FIELD

This application describes a storage medium, an information processing apparatus, an information processing system and an information processing method, in which some characters that are selected out of a plurality of characters owned by a user are used in predetermined information processing.

SUMMARY

It is a primary object of an embodiment(s) to provide a novel storage medium, information processing apparatus, information processing system and information processing method.

It is another object of the embodiment(s) to provide a storage medium, information processing apparatus, information processing system and information processing method, capable of providing a game with improved interest and strategic property.

A first embodiment is a non-transitory computer readable storage medium storing an information processing program that is executable by a computer comprising one or more processors, wherein the information processing program causes the one or more processors to: set an at least one available character out of a plurality of characters capable of being used by a user to be used in an event where an enemy character appears; start the event in a state where at least a part of an attribute of the enemy character is not disclosed to the user; proceed the event based on at least time elapse and an affinity between an attribute of the available character and the attribute of the enemy character; present a progress state of the event to the user after starting the event; disclose according to the progress state of the event at least a part of the attribute having not disclosed to the user; and re-set, based on a user operation, the available character to be used in the event when a request by the user occurs after starting the event.

According to the first embodiment, since the available character is re-set based on the progress state of the event and at least the part of the attribute of the enemy character disclosed according to the progress state of the event, it is possible to provide pleasure of estimating the enemy character and pleasure of re-setting the available character capable of winning over the enemy character. That is, it is possible to provide a game with improved interest and strategic property.

A second embodiment is the storage medium according to the first embodiment, wherein the information processing program causes the one or more processors to present to the user a hint concerning the attribute of the enemy character appearing in the event before starting the event, and the available character to be used in the event is set based on the user operation.

According to the second embodiment, it is possible to estimate the enemy character not only based on the attribute to be disclosed but based on the hint.

A third embodiment is the storage medium according to the first embodiment, wherein the information processing program causes the one or more processors to stop progress of the event when a request by the user occurs or when a predetermined time period elapses after starting the event.

A fourth embodiment is the storage medium according to the third embodiment, when the event is started after a stop, the event is started from a progress state of the event concerning the enemy character at a time point of stopping the event.

According to the fourth embodiment, since the event is re-started from the progress state of the event concerning the enemy character at the time point of stopping the event, it is possible to re-start the event by stopping the progress of the event to change strategy.

A fifth embodiment is the storage medium according to the third embodiment, wherein the information processing program causes the one or more processors to execute a clear event concerning a clear of the event at the time point of stopping when the progress state of the event at the time point of a stop satisfies a clear condition.

According to the fifth embodiment, since the clear event is executed without waiting for the elapse of the predetermined time period when the clear condition is satisfied at the time point of stopping the event, it is possible to eliminate a wasteful time waiting for the elapse of the predetermined time period.

A sixth embodiment is the storage medium according to the third embodiment, wherein hit point values are set for the available character and the enemy character, and the hit point values being updated according to the progress of the event; and the information processing program causes the one or more processors to end the progress of the event when a first condition concerning the hit point value of the available character is satisfied or when a second condition concerning the hit point value of the enemy character is satisfied.

According to the sixth embodiment, for example, since the progress of the event is ended in a case where a game over occurs when the first condition is satisfied if the hit point value of the available character is lost, or a case where a game clear occurs when the second condition is satisfied if the hit point value of the enemy character is lost, it is possible to end the progress of the event without waiting for the elapse of the predetermined time period in a case where the game over occurs or a case where the game clear occurs.

A seventh embodiment is the storage medium according to the first embodiment, wherein a plurality of available characters to be used in an event that a plurality of enemy characters appear are set, and the information processing program causes the one or more processors to determine a plurality of groups by selecting respective opponents of a plurality of available characters from a plurality of enemy characters, whereby the event is proceeded based on an affinity between an attribute of the enemy character and an attribute of the available character for each group having been determined.

According to the seventh embodiment, it is possible to proceed the event in which the plurality of enemy characters and the plurality of available characters play battles in a one-on-one battle.

An eighth embodiment is the storage medium according to the seventh embodiment, wherein the information processing program causes the one or more processors to disclose the attribute of each of the plurality of enemy characters stepwisely according to the progress state of the event.

According to the eighth embodiment, since the attribute of each of the plurality of enemy characters is disclosed gradually and it is determined gradually whether estimation of the user is correct, there is pleasure of advancing the event.

A ninth embodiment is the storage medium according to the seventh embodiment, wherein the plurality of groups are automatically determined immediately after a start of the event.

According to the ninth embodiment, since the plurality of groups of the available characters and the enemy characters are automatically determined immediately after the start of the event, it is possible to start the event, even if it is a user who does not know the event.

A tenth embodiment is the storage medium according to the ninth embodiment, wherein the plurality of groups are determined so that a total amount of damages given to the enemy characters by the available characters becomes the largest.

According to the tenth embodiment, even when the available character determined automatically is used, it is possible to effectively give the damage to the enemy character.

An eleventh embodiment is the storage medium according to the seventh embodiment, wherein a sequential order is set for each of the plurality of available characters based on a user operation, and the information processing program causes the one or more processors to determine the plurality of groups based on the sequential order set to each of the plurality of available characters.

A twelfth embodiment is the storage medium according to the first embodiment, wherein the progress state of the event includes a remaining number of the enemy characters and/or hit point values, the remaining number of the enemy characters and/or the hit point values are decreased according to time elapse, and the remaining number of the enemy characters and/or the hit point values are presented to the user.

A thirteenth embodiment is an information processing apparatus comprises one or more processors configured to execute, setting an at least one available character out of a plurality of characters capable of being used by a user to be used in an event where an enemy character appears; starting the event in a state where at least a part of an attribute of the enemy character is not disclosed to the user; proceeding the event based on at least time elapse and an affinity between an attribute of the available character and the attribute of the enemy character; presenting a progress state of the event to the user after starting the event; disclose according to the progress state of the event at least a part of the attribute having not disclosed to the user; and re-setting, based on a user operation, the available character to be used in the event when a request by the user occurs after starting the event.

A fourteenth embodiment is an information processing system comprises one or more processors configured to execute, setting an at least one available character out of a plurality of characters capable of being used by a user to be used in an event where an enemy character appears; starting the event in a state where at least a part of an attribute of the enemy character is not disclosed to the user; proceeding the event based on at least time elapse and an affinity between an attribute of the available character and the attribute of the enemy character; presenting a progress state of the event to the user after starting the event; disclose according to the progress state of the event at least a part of the attribute having not disclosed to the user; and re-setting, based on a user operation, the available character to be used in the event when a request by the user occurs after starting the event.

A fifteenth embodiment is an information processing method, comprising: setting an at least one available character out of a plurality of characters capable of being used by a user to be used in an event where an enemy character appears; starting the event in a state where at least a part of an attribute of the enemy character is not disclosed to the user; proceeding the event based on at least time elapse and an affinity between an attribute of the available character and the attribute of the enemy character; presenting a progress state of the event to the user after starting the event; disclose according to the progress state of the event at least a part of the attribute having not disclosed to the user; and re-setting, based on a user operation, the available character to be used in the event when a request by the user occurs after starting the event.

According to each of the thirteenth to the fifteenth embodiments, it is also possible to provide a game with improved interest and strategic property.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 18 is a flow chart showing a fifth part of the non-limiting example overall game processing of the CPU incorporated in the game apparatus shown in FIG. 2, following FIG. 15.

DETAILED DESCRIPTION OF NON-LIMITING EXAMPLE EMBODIMENTS

Figure 1:
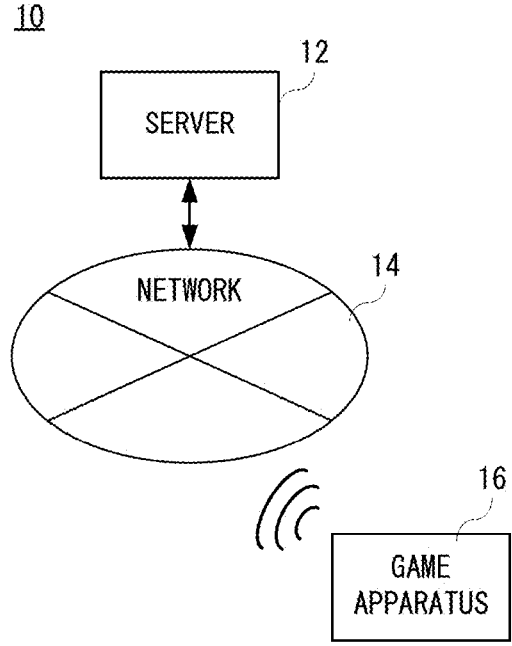
FIG. 1 is a view showing a non-limiting example game system.

With reference to FIG. 1, a non-limiting example information processing system 10 includes a server 12, and the server 12 is communicably connected with a game apparatus 16 via a network 14 such as Internet.

The server (information processing server) 12 is a general-purpose server, and comprises circuit components such as a CPU, a memory (HDD, ROM, RAM, etc.), a communication module, etc. The server 12 stores (manages) game data (player data 504c shown in FIG. 13) of a virtual game that is played in the game apparatus 16 of this embodiment in an internal memory or a data base connected to an outside in association with information of the game apparatus 16 (or a user or player).

The game apparatus 16 is an example of an information processing apparatus, and may be not only a game dedicated apparatus but various kinds of electronic devices having a game function. The electronic devices may be a smartphone, a portable telephone (or feature phone), a tablet PC, a notebook PC, etc., for example. However, there is no necessity of being limited to a portable electronic device, and a stationary electronic device such as a game apparatus, an arcade game apparatus, a desktop PC, etc. can be used.

Figure 2:
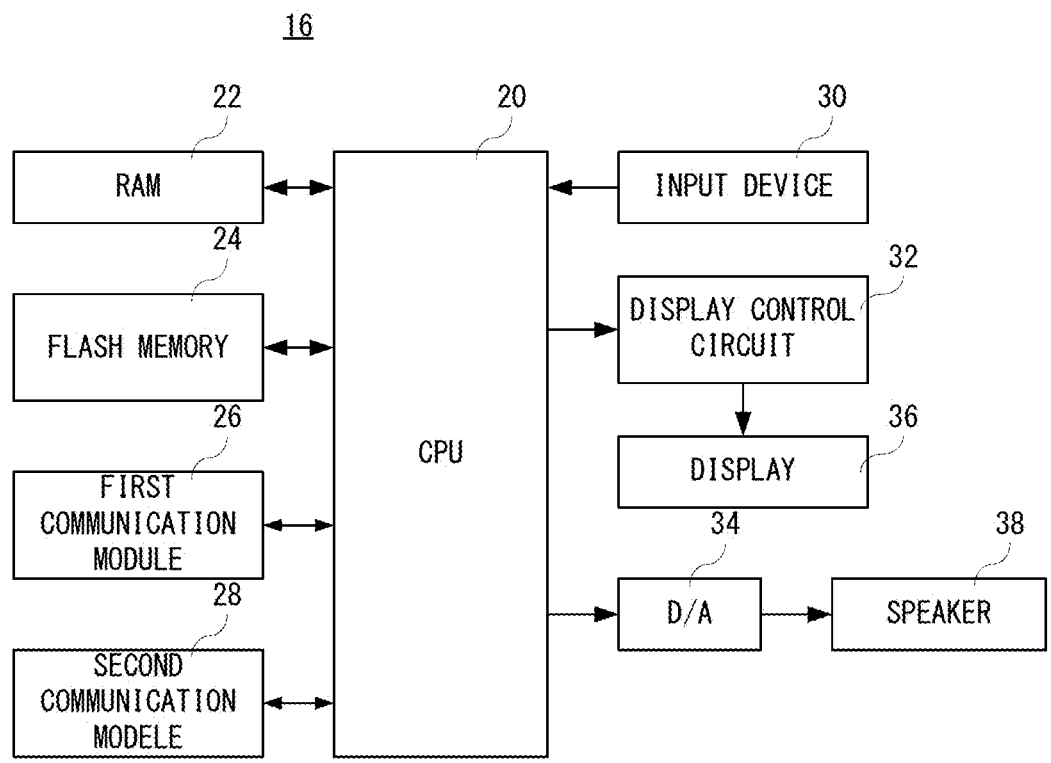
FIG. 2 is a block diagram showing a non-limiting example electric configuration of a game apparatus shown in FIG. 1.

FIG. 2 is a block diagram showing non-limiting example electric structure of the game apparatus 16 shown in FIG. 1. As shown in FIG. 2, the game apparatus 16 includes a CPU 20, and the CPU 20 is connected with a RAM 22, a flash memory 24, a first communication module 26, a second communication module 28, an input device 30, a display driver 32 and a D/A converter 34. Moreover, a display 36 is connected to the display driver 32, and a speaker 38 is connected to the D/A converter 34.

The CPU 20 is in charge of overall control of the game apparatus 16. The RAM 22 is a volatile storage medium and used as a working memory and a buffer memory for the CPU 20. The flash memory 24 is a nonvolatile storage medium, and used in order to store application program such as a game, and store (save) various kinds of data.

However, there is no necessity that an application is limited to a game application, and it is possible to perform various kinds of application such as a document production application, an email application, a painting application, character or letter practice application, a linguistic training application, a learning application, etc.

The first communication module 26 has a function to access a wireless LAN according to the standard of IEEE802.11.b/g, for example. Therefore, the CPU 20 transmits or receives data to or from further devices (the server 12 and/or other game apparatuses, etc.) via an access point and Internet (network) with using the first communication module 26, for example. However, it is also possible to transmit or receive data to or from other device directly with using the first communication module 26.

The second communication module 28 has a function to perform a short-distance wireless communication. Specifically, the second communication module 28 has a function to transmit or receive an infrared signal to or from other devices (here, other game apparatuses etc.) with a predetermined communication system (infrared ray system, for example), and a function to perform wireless communication with the same or similar kind of game apparatus according to a predetermined communication protocol (multilink protocol, for example). Therefore, the CPU 20 can transmit or receive data to or from the same or similar kind of other game apparatuses directly with using the second communication module 28, for example. However, instead of the short-distance wireless communication of an infrared ray system, short-distance wireless communication according to other wireless communication standards such as Bluetooth (registered trademark) may be performed.

The input devices 30 includes various kinds of push buttons or switches that are provided on the game apparatus 12, for example, and is used by a user or player (hereinafter, simply referred to as "player") for various kinds of operations such as menu selection and a game operation. However, as the input device 30, instead of the push buttons or switches, or together with the push buttons or switches, an input portion such as a pointing device (a touch panel etc., for example), a microphone, a camera, etc. may be provided. Moreover, the touch panel may be built into a display 36 to be described later. The display 36 in this case is a touch panel integrated type display.

The display driver 32 is used in order to display various kinds of images (screens) such as game images on the display 36 under instructions by the CPU 20. Although an illustration is omitted, the display driver 32 incorporates a video RAM (VRAM).

The D/A converter 34 converts sound data applied from the CPU 20 into an analog game sound so as to output to the speaker 38. In addition, the game sound means a sound required for the game, such as a sound of a game character or object, sound effect and music (BGM).

In addition, the electric structure of the game apparatus 16 shown in FIG. 1 is a mere example, and it does not need to be limited to this. For example, the second communication module 28 may be dispensed with.

Figure 3:
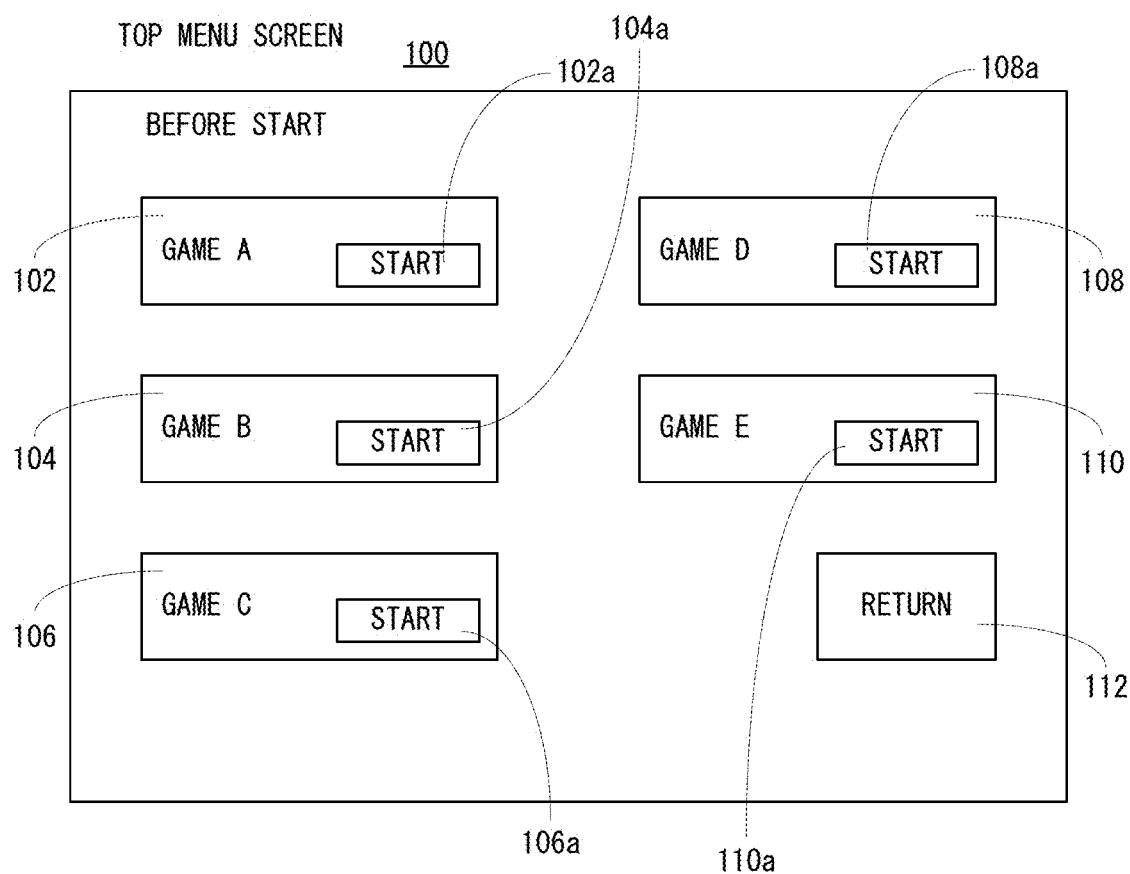
FIG. 3 is a view showing anon-limiting example top menu screen displayed on a display shown in FIG. 2.

FIG. 3 is a view showing a non-limiting example top menu screen 100 that is first displayed on the display 36 when an application of a virtual game to be played on the game apparatus 16 shown in FIG. 1 is started and play of an auto-play game is selected in a main menu or the like (not shown).

In addition, in the main menu, it is possible to select processing to play the auto-play game, processing to play a battle game, processing to select an available character to be used in the battle game out of owned characters, or processing to change a part of an attribute of the owned character.

The top menu screen 100 is a screen for selecting from a plurality of individual virtual games each of which is prepared as an auto-play game (hereinafter, referred to as "individual game") one individual game in order to play the same.

Here, the individual game (corresponding to "event where an enemy character appears") will be described. In the individual game of this embodiment, a plurality of player characters depart from a certain departure place toward a place where a plurality of enemy characters exist (or appear), and the plurality of player characters and the plurality of enemy characters play battles. Hereinafter, in this embodiment, departing of the plurality of player characters from the departure place is referred to as "starting the individual game". The plurality of player characters mean player characters that are set (or selected) to be used (hereinafter, each referred to as "available character") for battles with the plurality of enemy characters in the individual game out of the player characters owned by a player (hereinafter, may be each referred to as "owned character"). However, the owned character is a player character that the player can use in the individual game at least.

In this embodiment, although the available character (player character) and the enemy character are characters that imitate humans, it does not need to be limited to this. In other embodiments, a character imitating an animation character, an animal, a robot, an airplane, an automobile, etc. may be adopted.

A certain departure place and a place where a plurality of enemy characters exist are fictitious places, respectively and not generated in a virtual space. Moreover, the place where a plurality of enemy characters exist differs for each individual game. That is, the place where a plurality of enemy characters exist is set for each individual game. Moreover, a plurality of enemy characters that exist in each place are determined in advance, and a plurality of enemy characters that exist for each place differ. Furthermore, the number of the enemy characters existing in each place are the same as the number of the available characters (in this embodiment, 4 (four)) set in the individual game. Therefore, even if it the game has been cleared once, it is possible to play a battle with the same character again.

However, this is an example, and the number of the enemy characters existing in each place may be larger than the number of the available characters set in the individual game. In this case, the four enemy characters are selected at random, or selected based on affinity with the four available characters, for example.

Moreover, in this embodiment, a plurality of available characters and a plurality of enemy characters play battles one-on-one. During a period from a start to an end of the individual game, a plurality of available characters and a plurality of enemy characters play battles three (3) turns at the maximum, and the available character and the enemy character play battles as an offense side (or a defender side) each once in a single turn. However, since a special move may be performed or multiple attacks may be performed in a single attack, and in these cases, a damage applied to the opponent, i.e., a hit point value to be subtracted is larger than a hit point value to be subtracted by a normal attack. Here, the normal attack means an attack that gives to the opponent the damage that is set in advance with respect to that technique. When the available character or the enemy character loses the hit point value thereof, the character becomes impossible to play a battle and is thus defeated. Moreover, a case where the battle is performed the maximum three (3) turns is a case where at least one available character out of the plurality of available characters turns back to the departure place, while not becoming a game clear or game over. That is, one or more available characters may play battles with the enemy characters three times during a single expedition.

Furthermore, characters appearing in the individual game of this embodiment (characters such as an owned character, an available character, an enemy character) have color-classified attributes, and an offensive power, i.e., the damage given to the opponent changes depending on an affinity between the attributes. However, in this embodiment, the damage given to the opponent is changed not only by classified colors but also by a level and skill of the character as other attribute. A factor that changes the damage given to the opponent is an example, and need not be limited. Moreover, since a method of changing the damage given to the opponent is various, detailed description is omitted.

In this embodiment, as an example, each character appearing in the individual game has an attribute classified into one of red, blue and green depending on a type of equipped weapon. In this embodiment, a character having a red attribute is stronger than a character having a green attribute, the character having the green attribute is stronger than a character having a blue attribute, and the character having the blue attribute is stronger than the character having the red attribute. Therefore, an offensive power of the character having the red attribute is increased when attacking the character of the green attribute. Moreover, an offensive power of the character having the green attribute is increased when attacking the character of the blue attribute. Furthermore, an offensive power of the character having the blue attribute is increased when attacking the character of the red attribute. However, when a relationship between these colors is reversed, the offensive power is decreased. Moreover, in a case of characters having the same classified color, the offensive power is not changed according to an affinity between the colors. That is, the hit point value to be subtracted according to the battle is changed or determined based on the affinity between the colors that the available characters and the enemy characters are classified, respectively.

Furthermore, once started, the individual game is continued until a first predetermined time period (20 hours, in this embodiment) elapses even if the game apparatus 16 is not operated unless the game is cleared. Hereinafter, the first predetermined time period may be referred to as "operation time". However, in this embodiment, game processing of the individual game is executed by the server 12 at timings that the operation time is divided (divided into three equal parts, in this embodiment) rather than continuously executed during the operation time. However, the game processing of the individual game may be continuously executed during the operation time. Data regarding a result of the game processing of the individual game executed by the server 12 (hereinafter, referred to as "result data") is transmitted to the game apparatus 16. The result data of the game processing by the server 12 is data including a result of the battle by the plurality of available characters and the plurality of enemy characters for each turn, and information of items discovered by the plurality of available characters during execution of the individual game, and further includes result data from the start to the end of the individual game executed at the last time (hereinafter, referred to as "last time result data") when the same individual game has been executed in the past. However, the information on the discovered items is types and the number of the items.

That is, the individual game is proceeded based on an elapsed time, and the affinity between the colors into which the available characters and the enemy characters are classified, respectively. Although this embodiment is described using only the attribute of the colors classified according to the weapon that the available character and the enemy character equip (or use), there is no necessity that an attribute is limited to this. Other attribute may be used instead of the classified colors, or together with the classified colors. As other attribute, a type of technique used by the character, a type of transfer means (for example, on foot, a horse, etc.) of the character, etc. corresponds. Thus, the attribute of the character is used for the game processing of the individual game executed by the server 12.

In addition, the data regarding the attribute of the character used for the game processing of the individual game executed by the server 12 is stored in a storage device incorporated in the server 12 (may be a storage device that the server 12 is accessible), and is referred to by the server 12 when executing the game processing of the individual game.

Moreover, since the attribute of the character is referred to also when displaying a screen (150, 200, 250, 300, 350, 400) on the game apparatus 16, the data regarding the attribute of the character is stored by the flash memory 24 of the game apparatus 16 in association with the character, and a part of the data is arbitrarily read out to be stored in the RAM 22.

Moreover, in this embodiment, an end of the individual game includes an end due to the game clear or the game over, an end due to the elapse of the operation time not due to the game clear or the game over, and an end due to an operation or demand by the player not due to the game clear or the game over. In this embodiment, if the hit point values of all the enemy characters are lost, or the hit point value of character of the enemy general is lost (it means that a second condition is satisfied) before losing the hit point values of all the enemy characters, it becomes a game clear. Moreover, if the hit point values of all the available characters are lost (it means that a first condition is satisfied), it becomes a game over.

When the individual game is ended, it is possible to execute the same individual game again. That is, the available characters may make expedition to the same place multiple times. Therefore, there is a case where it becomes a game clear by executing (repeating) the same individual game multiple times.

Moreover, when executing the same individual game again, it is possible to re-set the available characters and arrangement positions of the available characters.

In addition, after starting the individual game, it is possible to confirm a result up to halfway of the individual game (hereinafter, may be referred to as "halfway result"), and after ending the individual game, it is also possible to confirm a result from the start to the end (hereinafter, may be referred to as "end result") (see FIG. 8 and FIG. 11).

As shown in FIG. 3, a top menu screen 100 is provided with display areas 102, 104, 106, 108 and 110, and above the display area 102, a character string indicating that this top menu screen 100 shown in FIG. 3 is a screen that is displayed before a start of the individual game (in this embodiment, "before start") is displayed.

In each of the display areas 102-110, identification information for identifying individual games (in this embodiment, title of the individual game) is indicated, and a button for executing corresponding individual game (in this embodiment, start button) is provided. In an example shown in FIG. 3, "GAME A" is indicated and a start button 102*a* is provided in the display area 102. The same applies to the other display areas 104-110. Moreover, a button (in this embodiment, "return button") 112 is provided in the top menu screen 100 below the display area 110. The return button 112 is a button for returning to a main menu.

In the top menu screen 100, when any one of the start buttons 102*a*-110*a* is turned on, a corresponding individual game (any one of GAME A-GAME E) will be executed or started. At this time, having started the individual game and the type of the started individual game (or title of the individual game) are notified to the server 12. Then, as described above, the server 12 executes game processing of the individual game of the type notified from the game apparatus 16.

Figure 4:
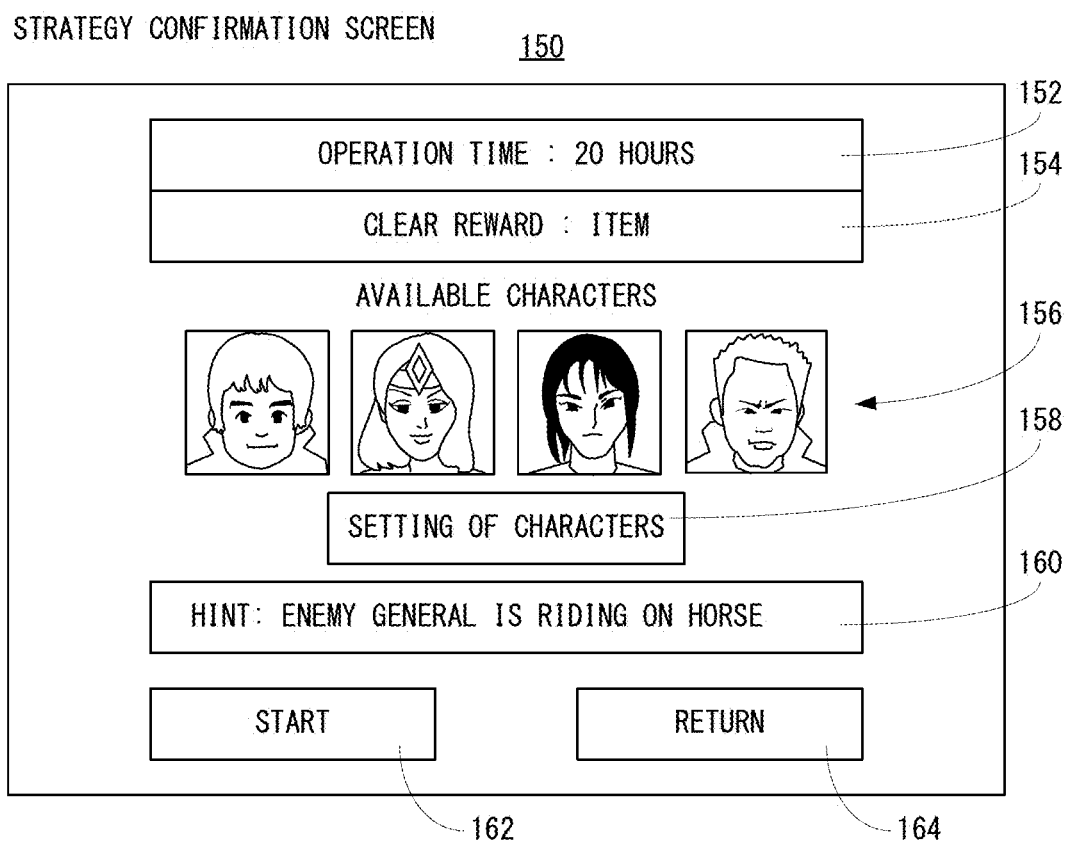
FIG. 4 is a view showing a non-limiting example strategy confirmation screen displayed on the display shown in FIG. 2.

FIG. 4 shows a non-limiting example strategy confirmation screen 150 displayed on the display 36 of the game apparatus 16. This strategy confirmation screen 150 is displayed on the display 36 when the start button 102*a* is turned in the top menu screen 100 shown in FIG. 3. Although detailed description is omitted, the same applies to the time of turning on another start button 104*a*, 106*a*, 108*a* or 110*a*.

The strategy confirmation screen 150 is a screen for confirming or changing strategy for the individual game. In this embodiment, the user can set types of the available characters and arrangement of the available characters. In the strategy confirmation screen 150, a display area 152 and a display area 154 are provided in an upper portion of the screen. The above-described operation time is indicated in the display area 152, and an item that is a reward obtainable when it becomes the game clear in the individual game (in this embodiment, referred to as "clear reward") is displayed in the display area 154.

In addition, as for an item as the clear reward, a name of the item and/or an image of the item may be displayed. Moreover, as for the clear reward, a plurality of items of the same type may be displayed, or items of a plurality of types may be displayed. In the following, the same applies to a case where an item is displayed.

Moreover, a display area 156, a button 158, a display area 160, a button 162 and a button 164 are provided below the display area 154 in the strategy confirmation screen 150.

The display area 156 is an area for displaying a plurality of (in this embodiment, four (4) bodies) available characters. In this display area 156, four display frames are provided side by side, and a face image of the available character used in the individual game is displayed in each of the display frames. At the time that the strategy confirmation screen 150 is first displayed on the display 36, four available characters are set at random out of owned characters.

However, a certain owned character may be set as an available character in preference to other owned characters in accordance with a place where the enemy character that is set in the individual game exists or that enemy character, for example.

Moreover, in other embodiments, four available characters may certainly be set by a player.

Moreover, after the player sets one or more available characters and sets arrangement of the available characters, a face image of each of the available characters that the player set is displayed in the display frame of the position that the player set. Moreover, although not expressed in the drawings, a color to which the available character is classified is attached to a background of the face image. However, this is an example, and in other examples, a predetermined pattern or an object image to which the classified color is attached may be displayed together with the face image. Moreover, in this embodiment, unless otherwise noted especially, when the face image of the available character or the face image of the enemy character is displayed, the classified color is applied as the background color.

Figure 5:
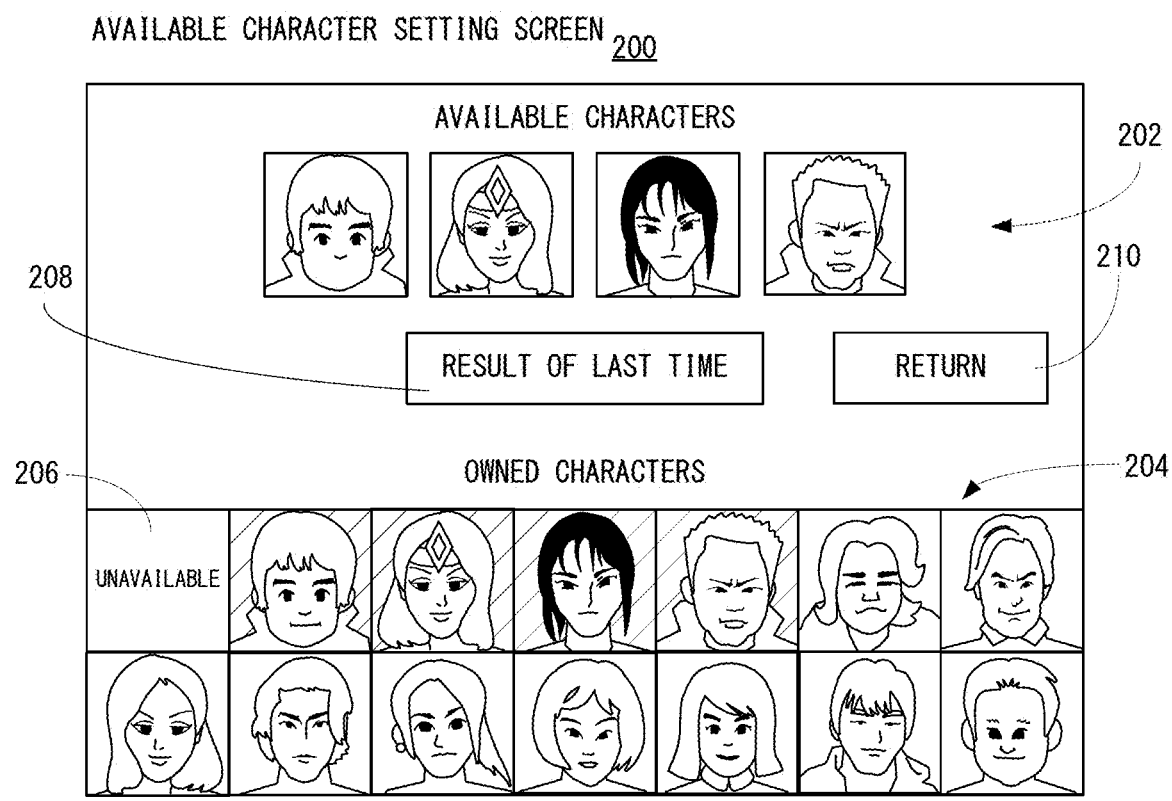
FIG. 5 is a view showing anon-limiting example available character setting screen displayed on the display shown in FIG. 2.

The button 158 is a button for setting an available character, and if this button 158 is turned on, an available character setting screen 200 will be displayed. FIG. 5 shows a non-limiting example available character setting screen 200.

As shown in FIG. 5, the available character setting screen 200 is provided with a display area 202 in an upper portion, and below this display area 202, a display area 204 is provided, and a button 206 is provided. Moreover, a button 208 and a button 210 are provided between the display area 202 and the display area 204.

The display area 202 is an area that displays a plurality of available characters, four display frames are provided in this display area 202 side-by-side, and face images of the available characters set to be used in the individual game are displayed in respective display frames. The display area 204 is an area that displays a plurality of owned characters, and a plurality of display frames are provided in this display area 204 side by side vertically and horizontally, and face images of the owned characters are displayed in respective display frames. However, when there are few owned characters than the number of the display frames, some display frames are made into a blank.

Moreover, in the available characters setting screen 200, a background of the owned character that is set to be used as the available character is attached with slanted lines. This is an example and there is no necessity of being limited, and in order to make the user understand that the owned character is being set to be used as the available character, the face image may be inverted in color, or a mark image indicating that the character is selected may be drawn on the face image.

In this available character setting screen 200, if wishing to re-set the available character, the player selects (touches) the face image of the available character that is not set to be used in the individual game, and selects the button 206. Then, the face image of the selected available character is erased from the display area 202, and the display frame of the display area 202 where the face image of this available character was displayed is made into a blank. Next, if the player selects in the display area 204 the face image of the owned character to wish to use for the individual game, this owned character is set to be used as an available character, and the face image of the set available character is drawn in the blank display frame of the display area 202. Thus, one or more available characters can be re-set.

In addition, the available character and the owned character may be directly replaced with each other by selecting the face image of the available character and the face image of the owned character, thereby to re-set the available character.

The above-described setting method of the available character is a mere exemplification, and does not need to be limited, and can be changed arbitrarily.

Moreover, the button 208 is a button for displaying a last time result. Therefore, since the last time result does not exist in executing an individual game for the first time, the button 208 is made to be a state incapable of being depressed.

Furthermore, the button 210 is a button for returning from the available character setting screen 200 to the strategy confirmation screen 150. That is, if the button 210 is touched or operated, the available character setting screen 200 is erased and the strategy confirmation screen 150 shown in FIG. 4 becomes to be displayed on the display 36.

Figure 6:
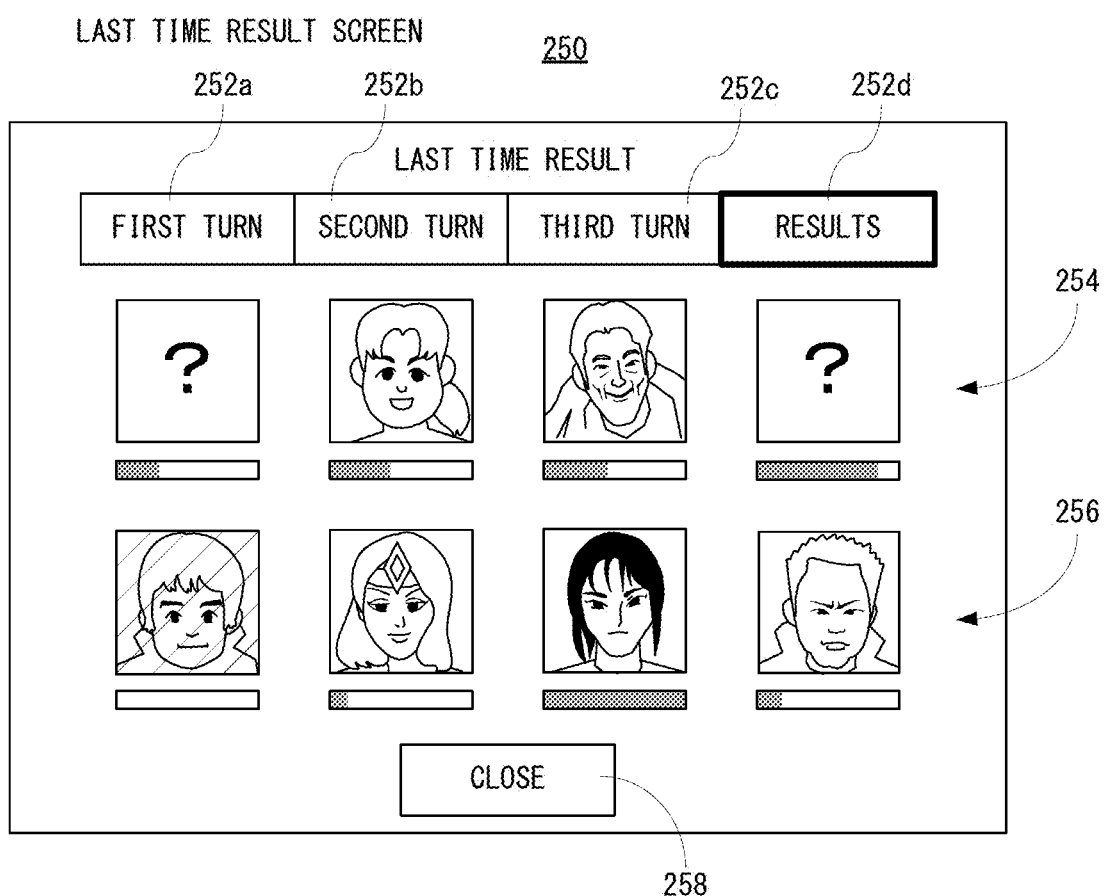
FIG. 6 is a view showing a non-limiting example last time result screen displayed on the display shown in FIG. 2.

As described above, if the button 208 is turned on a last time result screen 250 is displayed on the display 36. FIG. 6 shows a non-limiting example last time result screen 250. The last time result screen 250 is a screen showing a result from the start to the end when the individual game is executed at the last time, and is displayed based on data of the above-described last time result.

In this embodiment, during an operation time, it does not become a game clear or game over, and unless the player gives an instruction to end, battles with the enemy characters are performed for three turns (or three times). Therefore, the last time result screen 250 can display battle results for three turns at the maximum.

As shown in FIG. 6, the last time result screen 250 is provided with a plurality of buttons (or tabs) 252a, 252b and 252c for reproducing and displaying an animation of a battle result for each turn, and further provided with a button 252d for suspending reproduction of the animation in order to display only a result after the end (hereinafter, referred to as "total result"). In the last time result screen 250, the button 252a, 252b, 252c or 252d corresponding to the result that is being displayed is emphasized. A button image is displayed as a thick frame in the example shown in FIG. 6. However, this is an example, and in other examples, a button image may be blinked, or a brightness of the button image is made higher than those of other button images.

Moreover, in the last time result screen 250, below the plurality of buttons 252a-252d, there are provided with display areas 254 for the enemy characters, display areas 256 for the available characters and a button 258 for closing the last time result screen 250.

Four display frames are provided in the display area 254 side-by-side, and a face image of the enemy character or an image of "?" is displayed in each of the display frames. Moreover, four display portions are provided in the display area 254 below corresponding to the display frames, respectively. The display portion displays a residual quantity of the hit point value of the enemy character as the length of a bar of a predetermined color (in the drawing, gray). Moreover, it is possible to know a cumulative amount of the damage given to the enemy character by the length of the background color (in the drawing, white) of the display portion.

Similarly, four display frames are provided in the display area 256 side-by-side, and a face image of the available character is displayed in each of the display frames. The four available characters are displayed in the display frames on a sequential order that the player selects in the available character setting screen 200, respectively. However, when the player does not perform setting of the available character or the like, the available characters that are set at random by a computer (in this embodiment, CPU 20) are displayed in the display frames on a sequential order that the computer selects at random.

Moreover, four (4) display portions are provided in the display area 256 below corresponding to the display frames, respectively. The display portion displays a residual quantity of the hit point value of the available character as the length of a bar of a predetermined color (in the drawing, gray). However, it is possible to know a cumulative amount of the damage given to the available character by the length of the background color (in the drawing, white) of the display portion.

In this embodiment, the four enemy characters that play battles with the four available characters are four enemy characters existing in a place that is set in the individual game. Moreover, the four enemy characters are respectively displayed in the display frames on a sequential order selected by the computer. In this embodiment, when the four available characters attack respective corresponding four enemy characters, the four enemy characters are arranged in the display frames so that the damage (hit points value to be subtracted) given to the four enemy characters become maximum. Moreover, in this embodiment, the four enemy characters, once arranged, are fixedly displayed until the hit point values of the four enemy characters become 0 (zero).

However, a method of arranging the four enemy characters is an example, and should not be limited. In other embodiments, the four enemy characters may be arranged in the display frames determined in advance, respectively, or may be arranged in the display frames determined at random.

That is, as shown in the last time result display screen 250, the enemy characters play battles with the available characters are enemy characters arranged side by side in the vertical direction (or in the front). Therefore, arrangement positions of the enemy characters that play battles with the available characters are determined according to the positions of the available characters arranged in the available character setting screen 200, and a plurality of groups (four groups, in this embodiment) of the available characters and the enemy characters that play battles one-on-one are determined. That is, a plurality of groups are determined by selecting each opponent of a plurality of available characters from a plurality of enemy characters.

However, the available character win the enemy character arranged side by side in the vertical direction, but when it does not become a game clear, the available character plays a battle with the enemy character arranged near. In this case, for example, the enemy character arranged on a left side is selected as an opponent for the available character, and when no enemy character arranged on the left side exists or the enemy character on the left side loses, the enemy character arranged on a right side is selected as an opponent. These are the same for other result screens (a halfway result screen 300 and an end result screen 400, described later).

Moreover, in this embodiment, at the beginning of starting the individual game, face images of the four enemy characters are not displayed, and an image of "?" is displayed in each of the display frames. The face images of the enemy characters are revealed one by one as the individual game progresses. The enemy character to be revealed is selected at random from the plurality of enemy characters not having been revealed. However, when the number of the enemy characters not having been revealed is one (1), this enemy character is revealed. In this embodiment, the enemy characters are revealed one by one in predetermined turn numbers. Such revelation is performed in a second turn, a third turn, a fifth turn and a sixth turn, for example. However, since only a maximum of three (3) turns are played in a single time of the individual game, the fifth and sixth turns correspond to the second and third turns of an individual game at the second time is executed. However, when losing the battle, the enemy character is revealed in a result of the losing turn, even not in the predetermined turn number.

In addition, although the enemy character to be revealed is selected at random out of the plurality of enemy characters not having been revealed in this embodiment, the enemy character to be revealed may be selected by the player.

At the beginning of the time that such the last time result screen 250 is displayed on the display 36, the last time result is sequentially displayed for each available character from a battle result of the first turn. When an animation of the battle result is reproduced, a state where the face image of the available character and the face image of the enemy character or the image of "?" are moved in a direction that the both approach each other and the face image of the available character and the face image of the enemy character or the image of "?" collide with each other is displayed. In this embodiment, the animation of the battle result is reproduced sequentially from the group of a left end available character and an enemy character. At this time, it is expressed by the animation that a special move is performed or multiple attacks are performed in a single attack.

It is possible for the player to know, from the last time result, a magnitude of the damage that the enemy character is given by the available character and a magnitude of the damage that the available character is given by the enemy character, and to estimate a color into which the enemy character not having revealed is classified by taking into consideration a level and skill of the available character. Based on this estimated result, the player can re-set the available character or can re-set the arrangement position of the available character. However, the arrangement of the available characters is positions of the display frames in the display area 156 of the strategy confirmation screen 150, in the display area 202 of the available character setting screen 200 and in the display area 256 of the last time result screen 250. A reason why the arrangement position of the available character is re-set is in order to change an opponent of the enemy character. In addition, as described above, the arrangement position of the enemy character is fixed.

Returning to FIG. 6, if the button 258 is touched or operated, the display returns to the available character setting screen 200 shown in FIG. 5. That is, the last time result screen 250 is erased from the display 36, and the available character setting screen 200 is displayed on the display 36. Therefore, with referring to the last time result, as described above, it is possible to re-set the available character or to re-set the arrangement position of the available character. Moreover, if touching or operating the button 210 in the available character setting screen 200 of FIG. 5, the display returns from the available character setting screen 200 to the strategy confirmation screen 150.

Returning to FIG. 4, a hint regarding the enemy character is displayed in the display area 160. In the example shown in FIG. 4, what "enemy general is riding on horse" is displayed. According to the plurality of enemy characters existing in the place set in the individual game, changing amounts of the hit point values in the above-described last time result screen 250 and this hint, it is possible to estimate the enemy general character and other enemy characters. Therefore, it can be said that the player devises a strategy while estimating the enemy characters and changes the strategy, so that it is possible to provide an individual game, i.e., an auto-play game with improved interest and strategic property.

If the button 164 is turned on in the strategy confirmation screen 150 shown in FIG. 4, the display returns to the top menu screen 100 shown in FIG. 3. However, as described later, in a case where the battle has been played one or more turns after the start of the individual game, if the button 164 is turned on in the strategy confirmation screen 150, the display returns to the top menu screen 100a (see to FIG. 7) that the progress can be confirmed.

Moreover, if the button 162 is turned on in the strategy confirmation screen 150 shown in FIG. 4, the operation is started, whereby the plurality of available characters depart from the departure place toward the place set in the individual game corresponding to the start button 102a that is turned on in FIG. 3.

Figure 7:
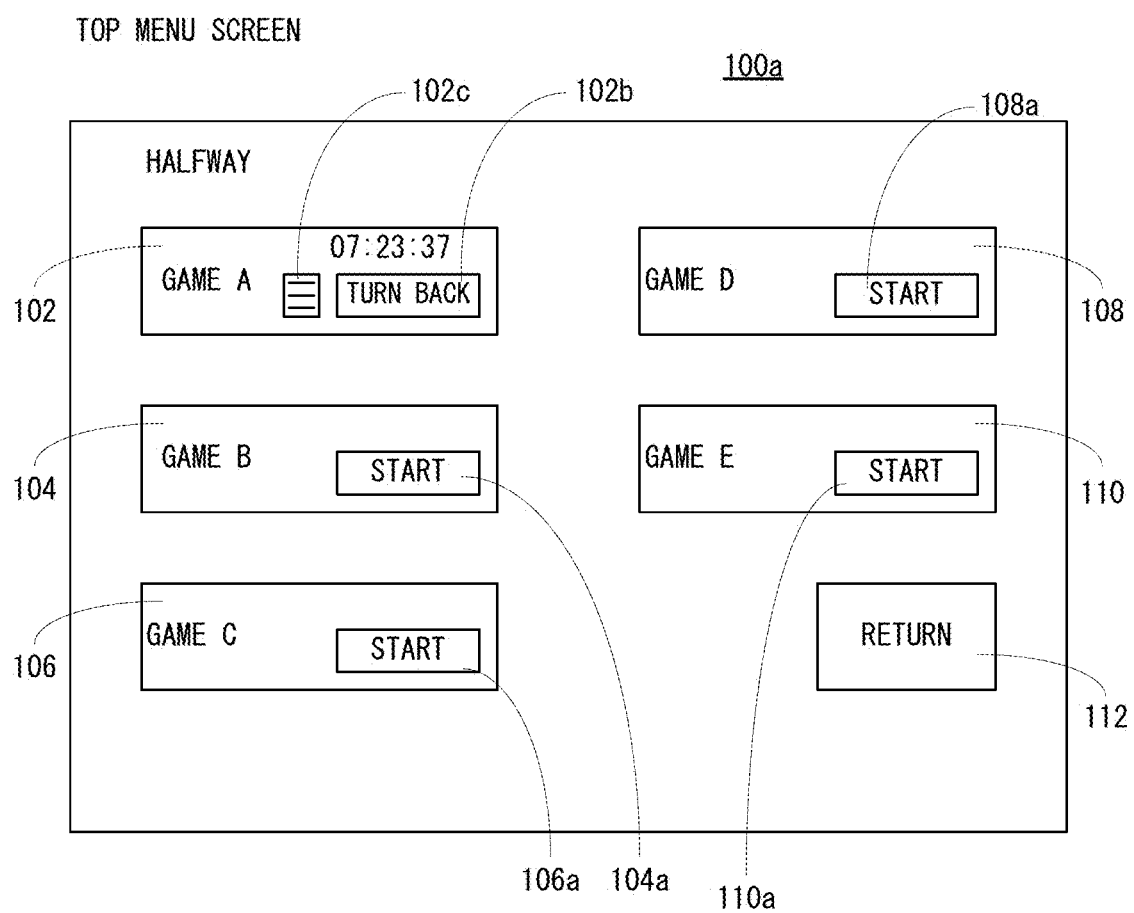
FIG. 7 is a view showing another non-limiting example top menu screen displayed on the display shown in FIG. 2.

FIG. 7 shows a non-limiting example top menu screen 100a capable of confirming a halfway result of the individual game. After the individual game is started and at least one turn is ended, even the individual game has not been ended, it is possible to confirm the halfway result (or progress). In the following, although the top menu screen 100a shown in FIG. 7 is described, by applying the same reference numerals to the same components as those of the top menu screen 100 shown in FIG. 3, and duplicate description will be omitted.

As shown in FIG. 7, the top menu screen 100a is provided with a button 102b in the display area 102 instead of the button 102a. Moreover, a button 102c is provided on a left side of the button 102b. The elapsed time from the start of the individual game is displayed above the button 102b. In the example shown in FIG. 7, it is indicated that 7 hours, 23 minutes, 37 seconds have elapsed. That is, it can be seen that the battle of the first turn is ended.

In addition, in other embodiments, a remaining time may be displayed instead of the elapsed time.

The button 102b is a button for stopping the individual game so as to return one or more available characters not having been lost to the departure place (hereinafter, may be referred to as "turning back"), which may be referred to as "turning back button". Such a button 102b is used to change the strategy by re-setting the available character in the halfway of the individual game, for example. When the turning back button (in this embodiment, 102b) is turned on, this individual game is ended in halfway. In this embodiment, when the turning back button is turned on, turning back is instructed to the server 12. According to this, the server 12 ends the game processing of the individual game for the game apparatus 16 that instructs the turning back, and stores, together with the game apparatus 16 or the player concerned, a fact that the available character is turned back, and the respective hit point values of the four enemy characters set in the individual game. Then, if the player of the same game apparatus 16 starts the same individual game, in the game processing of the individual game concerned, the server 12 uses the four enemy characters at the time of the turning back with the hit point values at the time of the turning back.

The button 102c is a button for confirming a progress state or progress of the individual game. When the button 102c is turned on, that is, when there is a request by the player, the halfway result screen 300 is displayed on the display 36. In this embodiment, the halfway result screen 300 is displayed on the display 36 as an example of presenting to the player the progress state or the halfway result of the individual game. FIG. 8 shows a non-limiting example halfway result screen 300. Although the halfway result screen 300 will be described in the following, duplicate description regarding the components the same as those in the last time result screen 250 shown in FIG. 6 is omitted.

Figure 8:
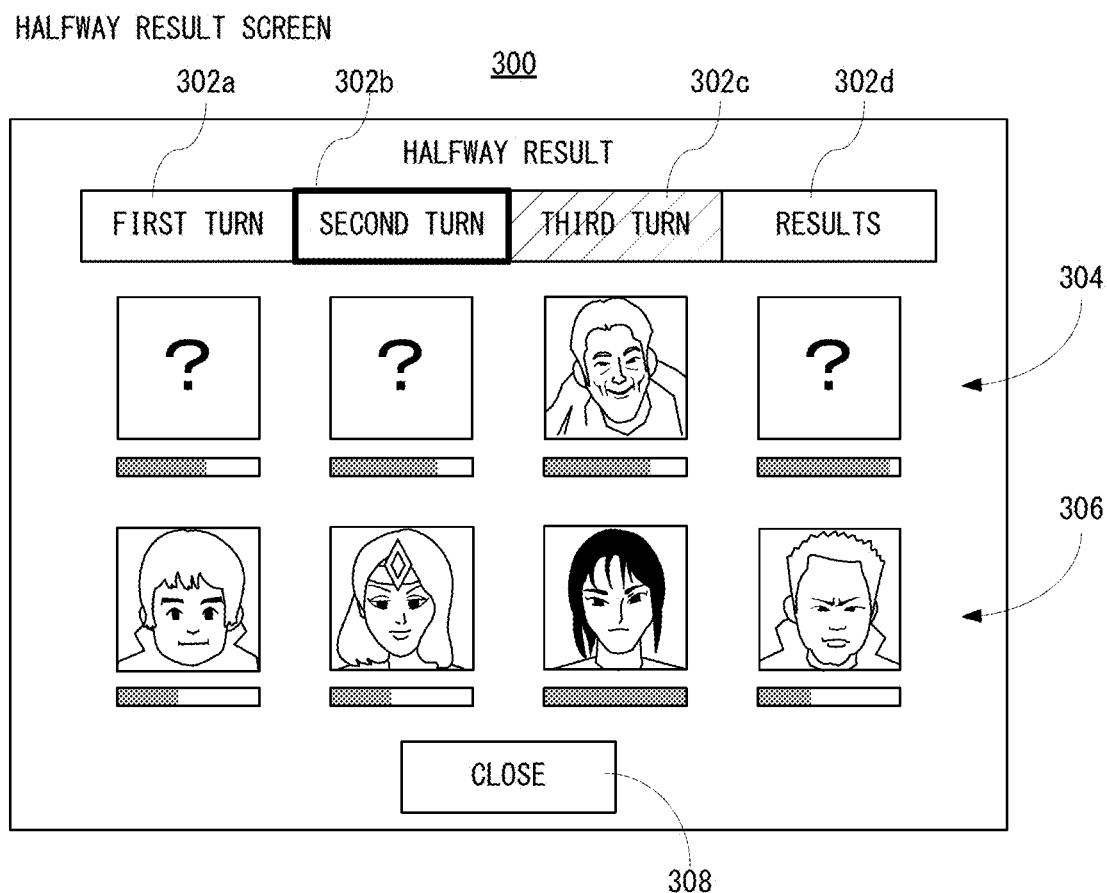
FIG. 8 is a view showing a non-limiting example halfway result screen displayed on the display shown in FIG. 2.

As shown in FIG. 8, the halfway result screen 300 is provided with a plurality of buttons (or tabs) 302a, 302b and 302c for displaying, for each turn, battle results up to the halfway of the individual game, and a button 302d for displaying a total result. Below the plurality of buttons 302a-302d, there are provided with a enemy character display area 304, an available character display area 306, and a button 308 for closing the halfway result screen 300.

If the halfway result screen 300 is displayed on the display 36, the battle results is displayed sequentially from the first turn. A point that the battle result is displayed one by one for each available character in each turn is the same as a case of the last time result screen 250.

However, in order not to see the battle in the third turn, the button 302 for third turn cannot be turned on in the halfway result screen 300 shown in FIG. 8. In FIG. 8, it is expressed by applying the slant lines to the third turn button 302 that the same cannot be turned on. This is an example, and the third turn button 302 does not need to be displayed. Therefore, the battles and the total result up to the second turn are displayed in the halfway result screen 300. If the player does not touch the third turn button 302, the total result is displayed after the battle results of the first turn and the battle results of the second turn are displayed sequentially.

As described above, when displaying the battle result of the second turn, one enemy character is revealed and the face image of the one enemy character is displayed on the display frame of the arrangement position determined in advance.

Figure 9:
FIG. 9 is a view showing a non-limiting example enemy character identification screen displayed on the display shown in FIG. 2.

FIG. 9 shows a non-limiting example enemy character identification screen 350. The enemy character identification screen 350 is a telop for notifying the identified enemy character to the player, and after being displayed for a second predetermined time period (for example, few or several seconds), it is erased. In the enemy character identification screen 350, a face image of the identified enemy character is displayed in the center of the screen, and above it, character strings regarding a name of the identified enemy character (in FIG. 9, "character M" is indicated) and a text indicating that the enemy character is identified are displayed. Therefore, when the halfway result screen 300 is displayed, thereafter, the face image of the identified enemy character becomes to be displayed always. Therefore, the enemy character identification screen 350 is not displayed again. The same applies to a case of displaying an end result screen 400 (see FIG. 11) is to be displayed.

In this embodiment, although all the enemy characters (or face images of the enemy characters) are hidden at the beginning of the start of the individual game and then gradually revealed, it does not need to be limited to this. In other embodiments, respective attributes such as a face image of the enemy character and a name of the enemy character may be revealed at different timings. In this case, a background color of the face image may be revealed at a timing different from that of the face image. That is, at least a part of the attribute of the enemy character may be hidden and gradually revealed. Thus, the attribute of the enemy character is used also in order to estimate the enemy character.

Returning to FIG. 8, if the button 308 is turned on in the halfway result screen 300, the display returns to the top menu screen 100a shown in FIG. 7.

Figure 10:
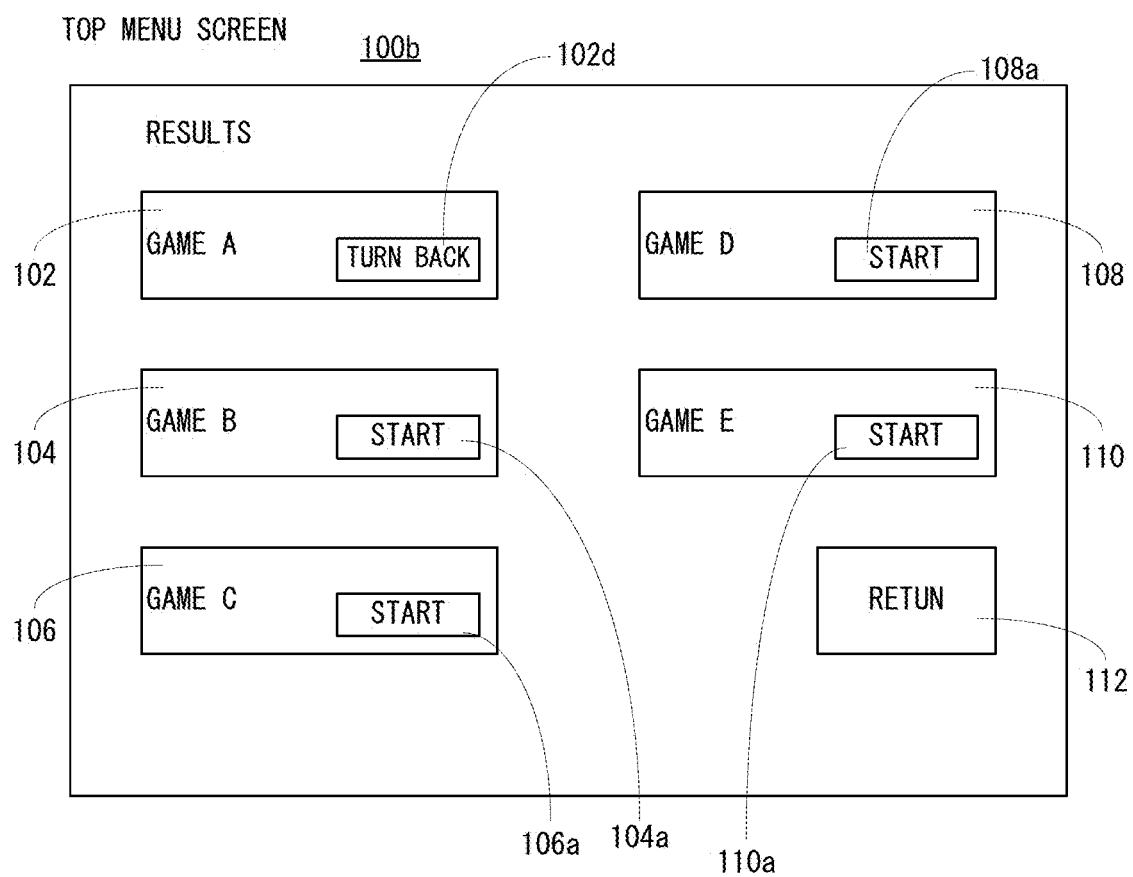
FIG. 10 is a view showing a further non-limiting example top menu screen displayed on the display shown in FIG. 2.

FIG. 10 shows a non-limiting example top menu screen 100b capable of confirming a result of the individual game. If an operation time elapses after the stat of the individual game, the battle results from the start to the end of the individual game can be confirmed. Although the top menu screen 100b shown in FIG. 10 will be described in the following, by applying the same reference numerals to the same components as those of the top menu screen 100 shown in FIG. 3, and duplicate description will be omitted.

As shown in FIG. 10, the top menu screen 100b is provided with a button 102d in the display area 102 instead of the button 102a.

The button 102d is a button for displaying a result that one or more remaining available characters not having been lost in the battle when the individual game is ended return to the departure place (i.e., a result the individual game having been ended). Such a button 102d is used when seeing the result of the individual game, and when changing, based on the result of the individual game, the strategy such as re-setting the available characters and/or the positions of the available characters.

However, in other embodiments, since the individual game is ended also when the individual game becomes the game over, the top menu screen 100b as shown in FIG. 10 may be displayed on the display 36 also in this case.

If the button 102d is turned on, an end result screen 400 is displayed on the display 36. FIG. 11 shows a non-limiting example end result screen 400. Although the end result screen 400 will be described in the following, duplicate description regarding the components the same as those in the last time result screen 250 shown in FIG. 6 is omitted.

Figure 11:
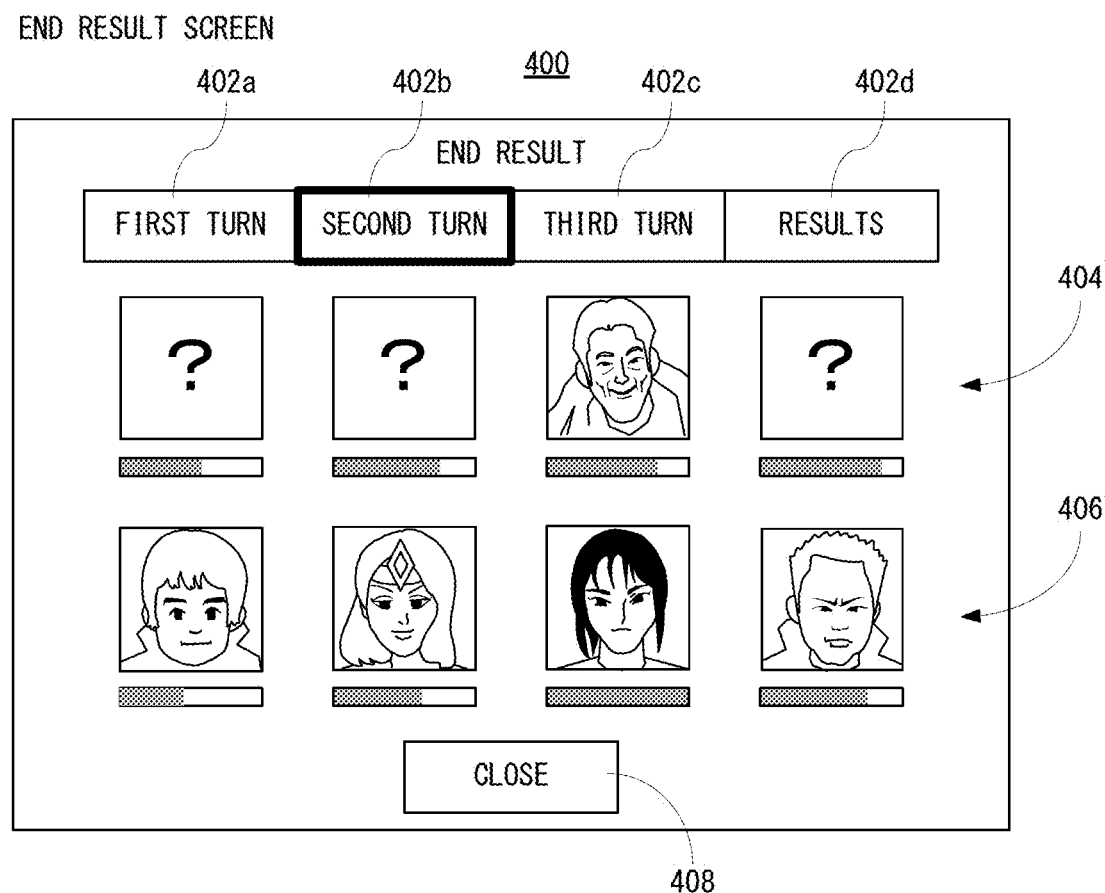
FIG. 11 is a view showing a non-limiting example end result screen displayed on the display shown in FIG. 2.

As shown in FIG. 11, the end result screen 400 is provided with a plurality of buttons (or tabs) 402a, 402b and 402c for displaying battle results for each turn until the individual game is ended, and further provided with a button 402d for displaying a total result. There are provided, below the plurality of buttons 402a-402d, with display areas 404 for the enemy characters, display areas 406 for the available characters and a button 408 for closing the end result screen 400.

If the end result screen 400 is displayed on the display 36, battle results will be displayed sequentially from the first turn. A point that the battle results are sequentially displayed one by one for each available character is the same as a case of the last time result screen 250.

The battle results of the second turn are displayed in the end result screen 400 shown in FIG. 11. As described above, when displaying the battle results of the second turn, it is determined that one enemy character selected at random is revealed, and the face image of the one enemy character that is to be revealed is displayed on the display frame of the arrangement position determined in advance. In the end result screen 400, if the button 408 is turned on, the display returns to the top menu screen 100b shown in FIG. 10, or an obtained reward screen 450 shown in FIG. 12 will be displayed.

When the individual game cannot be cleared by executing the game once, the same individual game can be continuously started from the top menu screen 100 shown in FIG. 3. That is, the battle with the four enemy characters in the first individual game can be continued. When the individual game cannot be cleared by executing the individual game twice, the same individual game can be continuously started from the top menu screen 100 shown in FIG. 3. The same applies to the third and subsequent times. In this case, the hit point values of the enemy characters are still in the state at the time of the end of the individual game at the last time, and are not reset. Therefore, it is possible to start again the same individual game in a state where the individual game is ended and the hit point values of the enemy characters at the time of ending is maintained.

When winning all the enemy characters or the enemy general character by repeatedly executing the individual game, the game is cleared. On the other hand, if all the available characters lose to the enemy character(s), the game is over. When the game is cleared or the game is over, a telop (on screen text) for notifying that is displayed.

Figure 12:
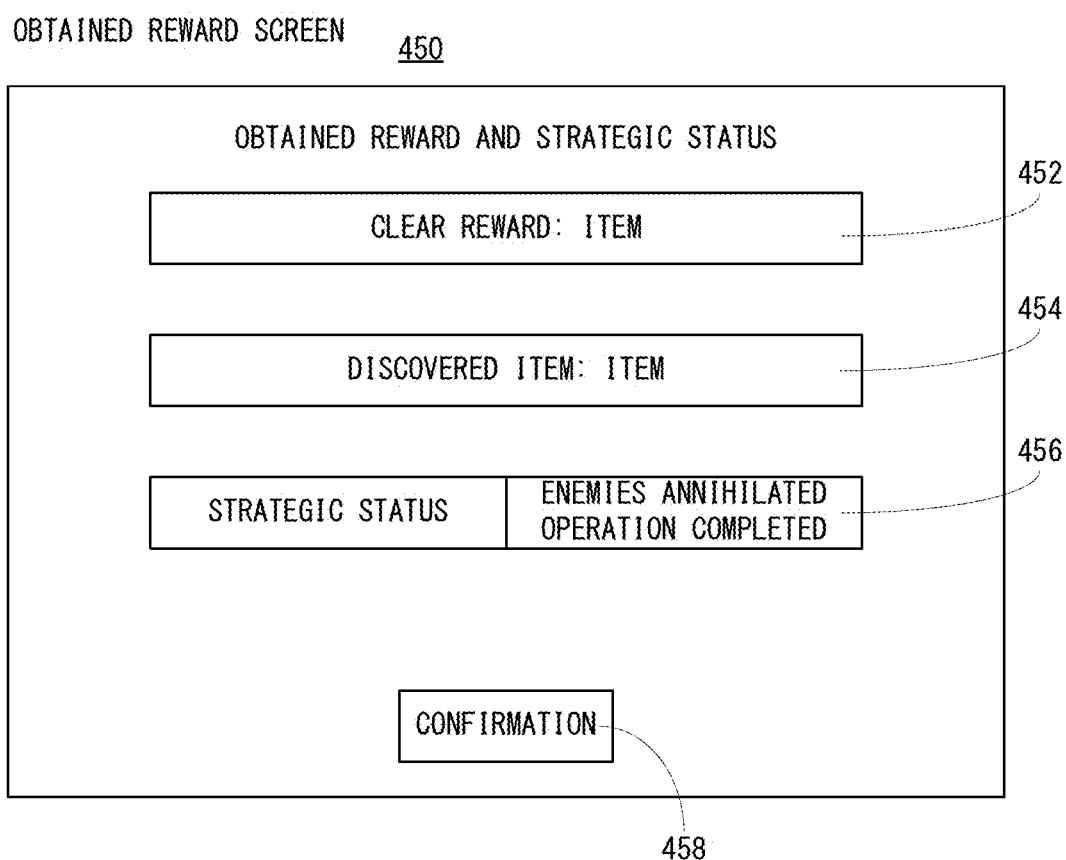
FIG. 12 is a view showing a non-limiting example obtained reward screen displayed on the display shown in FIG. 2.

Moreover, when the individual game is ended and one or more available characters return to the departure place, the available character or the player obtains a reward. That is, when the end result screen 400 is closed, an obtained reward screen 450 is displayed on the display 36. FIG. 12 shows a non-limiting example obtained reward screen 450. As shown in FIG. 12, the obtained reward screen 450 displays a reward obtained in this individual game (i.e., obtained reward) and a situation (i.e., strategic status) in this individual game.

In addition, in this embodiment, only when at least one available character returns to the departure place, the available character or the player obtains the reward, but it does not need to be limited to this. The available character or the player may obtain a reward even when the hit point values of all the four available characters become 0 (zero) and thus it becomes the game over. For example, a reward according to a play time may be obtained.

As shown in FIG. 12, in the obtained reward screen 450, character strings of obtained reward and strategic status are displayed in an upper portion, and below them, a display area 452 for a clear reward, a display area 454 for a discovered item and a display area 456 for the strategic status are provided, and further, below the display area 456, a button 458 is provided.

When the game is cleared, an image of an item and/or a name of the item that the available character or the player obtains are displayed in the display area 452. As a result of executing the individual game, an image of an item and/or a name of the item that the available character discovered in this individual game are displayed in the display area 454. However, the available character is not actually moved in the virtual space. The strategic status at a time of ending the individual game is displayed in the display area 456 in a text form. In the example shown in FIG. 12, it is indicated winning the battles with all the enemy characters and having completed the operation.

If the button 458 is turned on, the display returns to the top menu screen 100 as shown in FIG. 3. Therefore, when the game has not been cleared, by depressing or operating the start button 102a, it is possible to play the battles continuously against the four enemy characters with which the battles are played at the last time.

Figure 13:
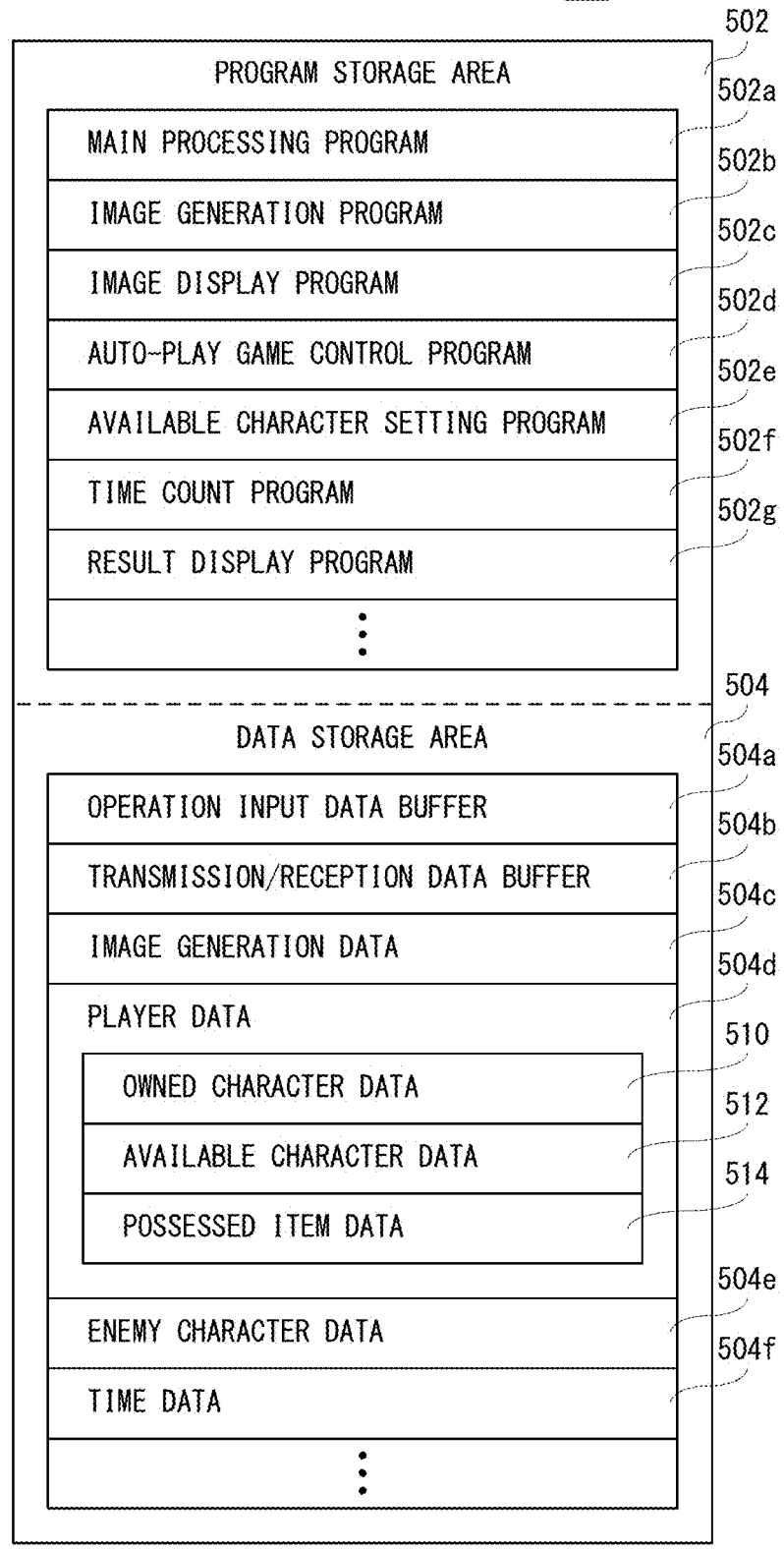
FIG. 13 is a view showing a non-limiting example memory map of a RAM incorporated in the game apparatus shown in FIG. 2.

FIG. 13 is an illustration view showing a non-limiting example memory map 500 of the RAM 22 of the game apparatus 16 shown in FIG. 2. As shown in FIG. 13, the RAM 22 includes a program storage area 502 and a data storage area 504. The program storage area 502 is stored with an information processing program such as an application program of a game of this embodiment, and the information processing program includes a main processing program 502a, an image generation program 502b, an image display program 502c, an auto-play game control program 502d, an available character setting program 502e, a time count program 502f, a result display program 502g, etc.

The main processing program 502a is a program for executing processing of a main routine (overall game processing) of the game application of this embodiment.

The image generation program 502b is a program for generating, using image generation data 504c and referring to player data 504d as needed, data (game image data) of a game image (the above-described screens 100, 150, 200, 250, 300, 350, 400, 450, etc.).

The image display program 502c is a program for outputting the game image data generated according to the image generation program 502b to the display 36. Therefore, the game image corresponding to the game image data is displayed on the display 36.

The auto-play game control processing program 502d is a program for executing game control processing regarding the auto-play game (in this embodiment, the individual game) in the overall game processing. However, this game control processing is executed by the CPU 20 of the game apparatus 16. Specifically, the game control processing is processing of steps S17-S91 shown by flow charts described later.

The available character setting program 502e is a program for setting (or re-setting), according to an operation of the player, the available character to be used in the individual game.

The time count program 502f is a program for counting elapsed time from the start of the individual game.

The result display program 502g is a program for displaying, according to an operation of the player, the last time result screen 250, the halfway result screen 300 and this end result screen 400 on the display 36. At this time, the image generation program 502b and the image display program 502c are also executed.

Although illustration is omitted, the program storage area 502 is stored with other programs such as a communication program for performing communication with the server 12 and other game apparatuses, a program for storing (saving) the player data 504d (game data) in the flash memory 24, a sound output program for generating and outputting a sound required for the game, etc.

The data storage area 504 is provided with an operation input data buffer 504a and transmission/receipt data buffer 504b. Moreover, the image generation data 504c, the player data 504d, enemy character data 504e, time data 504f, etc. are stored in the data storage area 504.

The operation input data buffer 504a is an area for temporarily storing operation data from the input device 50. When an operation is received by the CPU 20, the operation data is stored in the operation input data buffer 504a according to a time series, and if the operation data is used for the processing of the CPU 20, it will be deleted.

The transmission/receipt data buffer 504b is an area for temporarily storing transmission data or reception data when the game apparatus 16 performs communication with the server 12 and other game apparatuses. The transmission data includes the player data 504d to be transmitted to the server 12, and the reception data includes result data received from the server 12.

The image generation data 504c includes data for generating the game image data, such as polygon data, texture data, character data, etc. However, the character image data is image data regarding various kinds of characters or objects that are arranged and appear (occur) in the virtual space.

The player data 504d is data (game data) regarding the player of the virtual game according to this embodiment, and includes owned character data 510, available character data 512 and possessed item data 514.

The owned character data 510 is data regarding all the player characters the player owns, and specifically, is data regarding an attribute such as a name of the player character, a face image, a level, a hit point value and a technique at the time of attack. The available character data 512 is a copy of data regarding the owned characters set (or re-set) to be used in the individual game according to the available character setting program 502e. In this embodiment, since four available characters are set, the available character data 512 includes data of the four available characters. However, instead of copying the data of the owned characters, the data of the owned characters may be simply referred to.

The possessed item data 514 is data regarding the type and the number of the items that the player possesses or discovers.

The enemy character data 504e is data regarding the attribute of four enemy characters that are set when the individual game is started.

The time data 504f is data regarding the elapsed time counted according to the time count program 502f from the start of the individual game.

Although illustration is omitted, the data storage area 504 may be stored with other data, and provided with a flag(s) and other counter(s) (timer(s)) required for the overall game processing (information processing). As other data, the text data regarding the hint in a case of displaying the strategy confirmation screen 150 corresponds, and the hint is prepared in advance associated with for each individual game.

FIG. 14-FIG. 18 are flow charts of the overall game processing of the CPU 20 shown in FIG. 2. For example, this overall game processing is started according to instructions by the user to execute the program of the game application that is a non-limiting example information processing.

Figure 14:
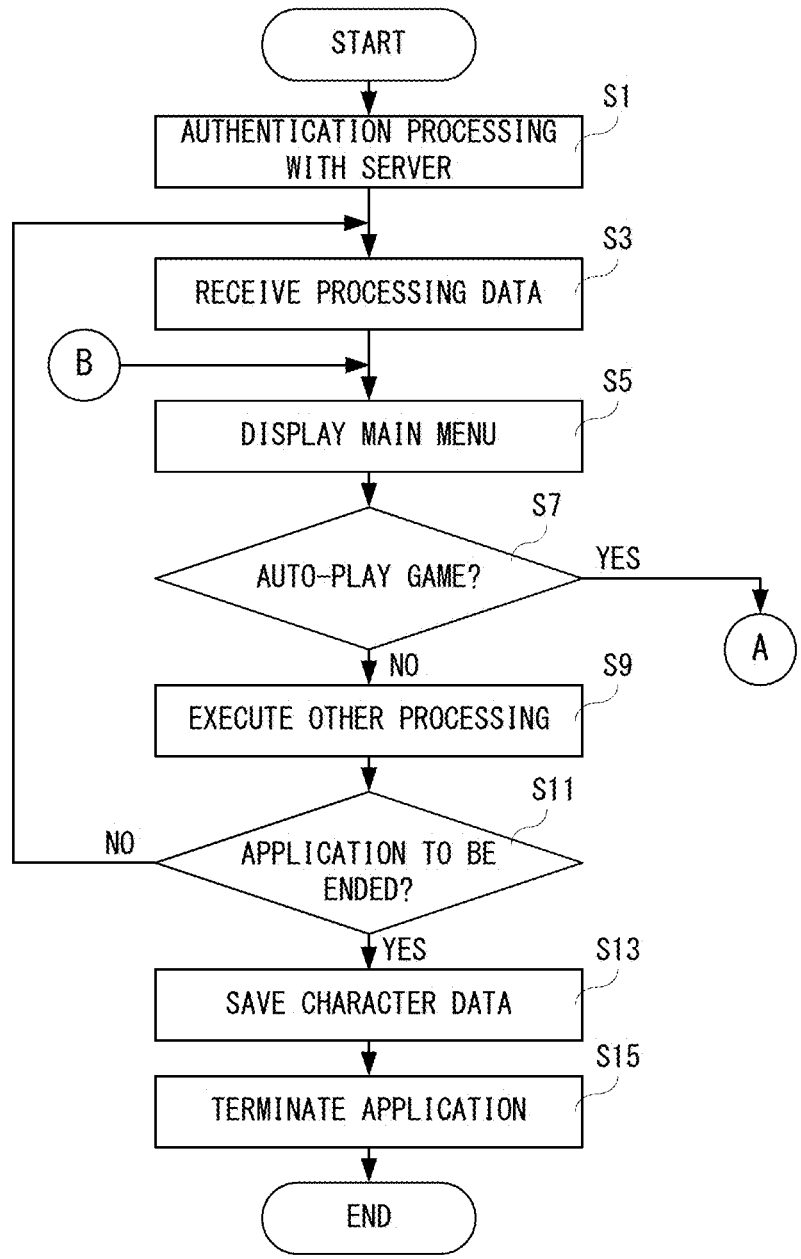
FIG. 14 is a flow chart showing a first part of non-limiting example overall game processing of a CPU incorporated in the game apparatus shown in FIG. 2.

As shown in FIG. 14, if the overall game processing is started, the CPU 20 executes, in a step S1, authentication processing with the servers 12. Here, the CPU 20 communicably connects the first communication module 26 to the server 12 via the network 14, and transmits information of the game apparatus 16 or the player and the player data 504c to the server 12.

If receiving the information of the game apparatus 16 or the player and the player data 504d, the server 12 reads the player data that is managed corresponding to information of the game apparatus 16 or the player, and confirms whether the received player data 504d and the read player data are in agreement.

When the received player data 504d and the read player data are in agreement, the authentication is successful, and this is transmitted to the game apparatus 16, whereby the game is continued. On the other hand, when the received player data 504d and the read player data are not in agreement, since there is a possibility that the player data 504d (game data) is altered, the authentication is not successful, and this is transmitted to the game apparatus 16. Although illustration is omitted, when the authentication is not successful, the overall game processing is forcibly terminated.

Moreover, when the individual game is started in the game apparatus 16, the server 12 receives (see step S27) notification of having started from the game apparatus 16, and then, executes the game processing (game processing by the side of the server 12) of the individual game from which received notification of having been started at every third predetermined time period (in this embodiment, 20 (twenty) hours/3), and transmits result data of the game processing by the side of the server 12 to the game apparatus 16. However, the result data of the game processing by the side of the server 12 is transmitted to the game apparatus 16 when the authentication is successful. Therefore, in a next step S3, the result data received from the server 12 is acquired. The acquired result data is stored in the transmission/reception data buffer 504b, and is used when displaying the top menu screens 100a and 100b, the strategy confirmation screen 150, the last time result screen 250, the halfway result screen 300 and the end result screen 400. However, since the result data is not received when the result data of the game processing by the side of the server 12 is not transmitted from the server 12, the processing in the step S3 is skipped.

In a next step S5, a main menu screen is displayed on the display 36. Subsequently, in a step S7, it is determined whether it is selected to play an auto-play game. Although illustration is omitted, it is determined whether an icon for selecting to play an individual game is turned on in the main menu screen.

If "NO" is determined in the step S7, that is, if it is not selected to play the individual game, other processing is executed in a step S9. Here, according to an operation of the player, execution of a game different from the individual game (for example, another battle game), or confirmation and/or change of the level and/or skill of the owned characters is performed. However, when the player is only looking at the main menu screen, the processing in the step S9 is skipped.

Then, it is determined, in a step S11, whether the application is to be ended based on an input from the input device 30. Here, the CPU 20 determines whether an end of application is instructed by the player.

If "NO" is determined in the step S11, that is, if it is not an instruction to end the application, the process returns to the step S3. On the other hand, if "YES" is determined in the step S11, that is, if it is an instruction to end the application, the player data 504*d* is saved in a step S13. In the step S13, the CPU 20 saves the player data 504*d* in the flash memory 24, and transmits the same to the server 12. Therefore, the server 12 updates the player data 504*d* corresponding to the information of the game apparatus 16 or the player. The same applies to a step S79 described later. Then, the application is ended in a step S15 to terminate the overall game processing.

Figure 15:
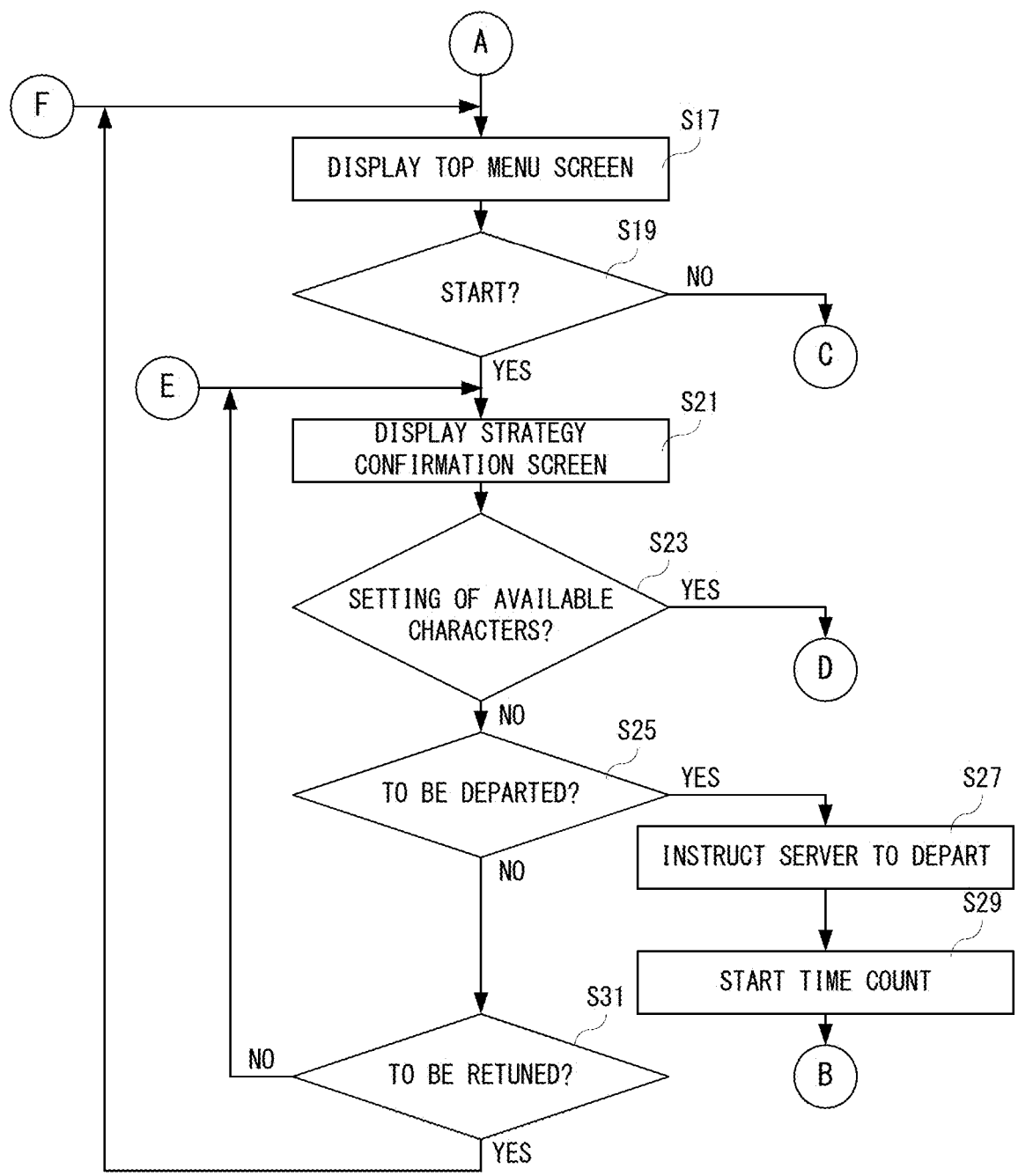
FIG. 15 is a flow chart showing a second part of the non-limiting example overall game processing of the CPU incorporated in the game apparatus shown in FIG. 2, following FIG. 14.

Moreover, if "YES" is determined in the step S7, that is, if the individual game is to be played, as shown in FIG. 15, in a step S17, the top menu screen (in this embodiment, 100, 100*a* or 100*b*) is displayed on the display 36. That is, in the step S17, before a start of the individual game, the top menu screen 100 as shown in FIG. 3 is displayed. Moreover, after starting the individual game, the top menu screen 100 is displayed before the available characters and the enemy characters play battles, and after the available characters and the enemy characters play battles at least one (1) turn, the top menu screen 100*a* shown in FIG. 7 is displayed before ending the battle in the individual game. Moreover, when ending the battles in the individual game, the top menu screen 100*b* as shown in FIG. 11 is displayed. Which one of the top menu screens 100, 100*a* and 100*b* is to be displayed is determined by the result data transmitted from the server 12.

Moreover, in the step S17, the CPU 20 generates the game image data of the top menu screens 100, 100*a* or 100*b* with using the image generation data 504*c* and referring to the result data of the game processing by the side of the server 12 acquired from the server 12, and outputs the generated game image data to the display 36.

In a subsequent step S19, it is determined whether the individual game is to be started. Here, the CPU 20 determines whether the button 102*a*, 104*a*, 106*a*, 108*a* or 110*a* is turned on in the top menu screen 100, 100*b* or 100*c*.

In addition, although detailed description is omitted, it is possible to simultaneously execute a plurality of individual games, and therefore, another individual game not having been started can be also started when the top menu screen 100*b* or 100*c* is being displayed.

Figure 16:
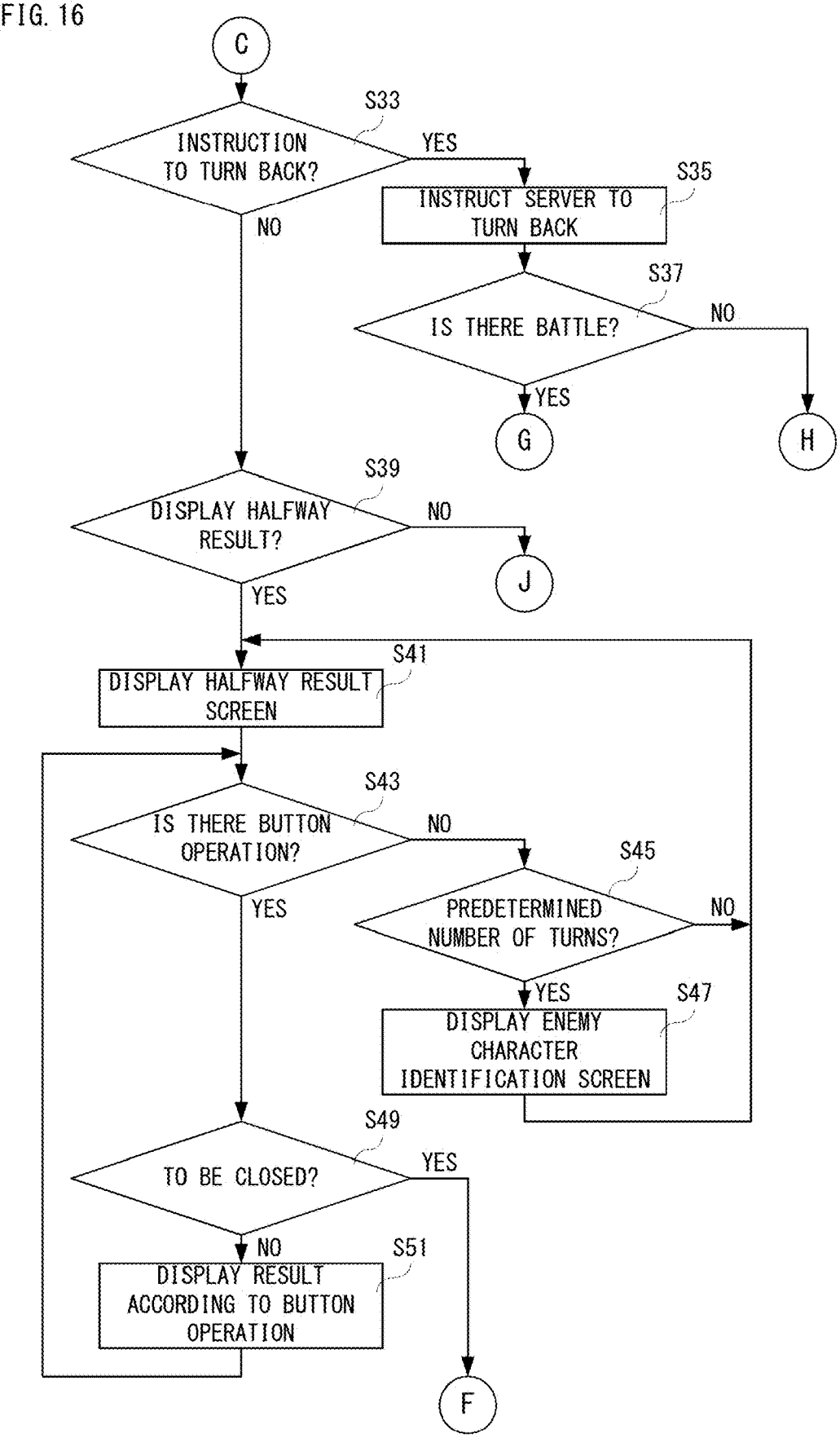
FIG. 16 is a flow chart showing a third part of the non-limiting example overall game processing of the CPU incorporated in the game apparatus shown in FIG. 2, following FIG. 15.

If "NO" is determined in the step S19, that is, if the individual game is not to be started, the process proceeds to a step S33 shown in FIG. 16. On the other hand, if "YES" is determined in the step S19, that is, if the individual game is to be started, the strategy confirmation screen 150 as shown in FIG. 4 is displayed on the display 36 in a step S21. As described above, when the individual game is started and the strategy confirmation screen 150 is displayed for the first time, four owned characters randomly selected out of the plurality of owned characters are set as four available characters, and arranged at random in the display frames of the display area 156. When the available characters and the display frames are set by the player, the strategy confirmation screen 150 is displayed according to the contents after such setting. Moreover, in the step S21, the CPU 20 generates the game image data of the strategy confirmation screen 150 with using the image generation data 504*c* and the text data regarding the hint and referring to the player data 504*d*, and outputs the generated game image data to the display 36.

In a subsequent step S23, it is determined whether it is setting of the available character. That is, it is determined whether the button 158 is turned on. If "YES" is determined in the step S23, that is, if it is setting of the available character, the process proceeds to a step S73 of FIG. 18. On the other hand, if "NO" is determined in the step S23, that is, if it is not setting of the available character, it is determined whether it is departure in a step S25. That is, it is determined whether the button 162 is turned on.

If "YES" is determined in the step S25, that is, if it is departure, departure is instructed to the server 12 in a step S27. Therefore, the server 12 executes the game processing of the individual game that the instruction of departure is applied for the game apparatus 16 from which the instruction of departure is applied. As described above, the game processing by the side of the server 12 includes processing for respectively arranging four enemy characters existing in the place set in the individual game into the display frames, processing of calculation of battle results at every third predetermined time period, determination of the discovered item, and so on. The time period count is started in a next step S29, and the process returns to the step S3. In the step S29, the CPU 20 starts update of the time data 504*f*.

Moreover, if "NO" is determined in the step S25, that is, if it not departure, it is determined, in a step S31, whether the display is to be returned. That is, it is determined whether the button 164 is turned on. If "NO" is determined in the step S31, that is, if the display is not to be returned, the process returns to the step S21. On the other hand, if "YES" is determined in the step S31, that is, if the display is to be returned, the process returns to the step S17.

As described above, if "NO" is determined in the step S19 of FIG. 15, it is determined, in the step S33 shown in FIG. 16, whether there is an instruction to turn back. Here, the CPU 20 determines whether the turning back button (in FIG. 7, button 102*b*) is turned on in the top menu screen 100*a* as shown in FIG. 7.

If "YES" is determined in the step S33, that is, if there is an instruction to turn back, turning back is instructed to the server 12 in a step S35. Then, the server 12 ends the game processing of this individual game for this game apparatus 16. In a case of turning back, if a start of the same individual game is instructed from the same game apparatus 16, the server 12 starts the game processing using the four enemy characters at the time of turning back with the hit point values at the time of turning back. That is, it is possible to start again the same individual game using the hit point values of the enemy characters at the time of the end of the individual game.

In a subsequent step S37, it is determined whether there is any battle. Here, the CPU 20 determines whether there is result data of the game processing by the side of the server 12 transmitted from the server 12, that is, whether the available characters and the enemy characters play the battles at least one (1) turn.

Figure 17:
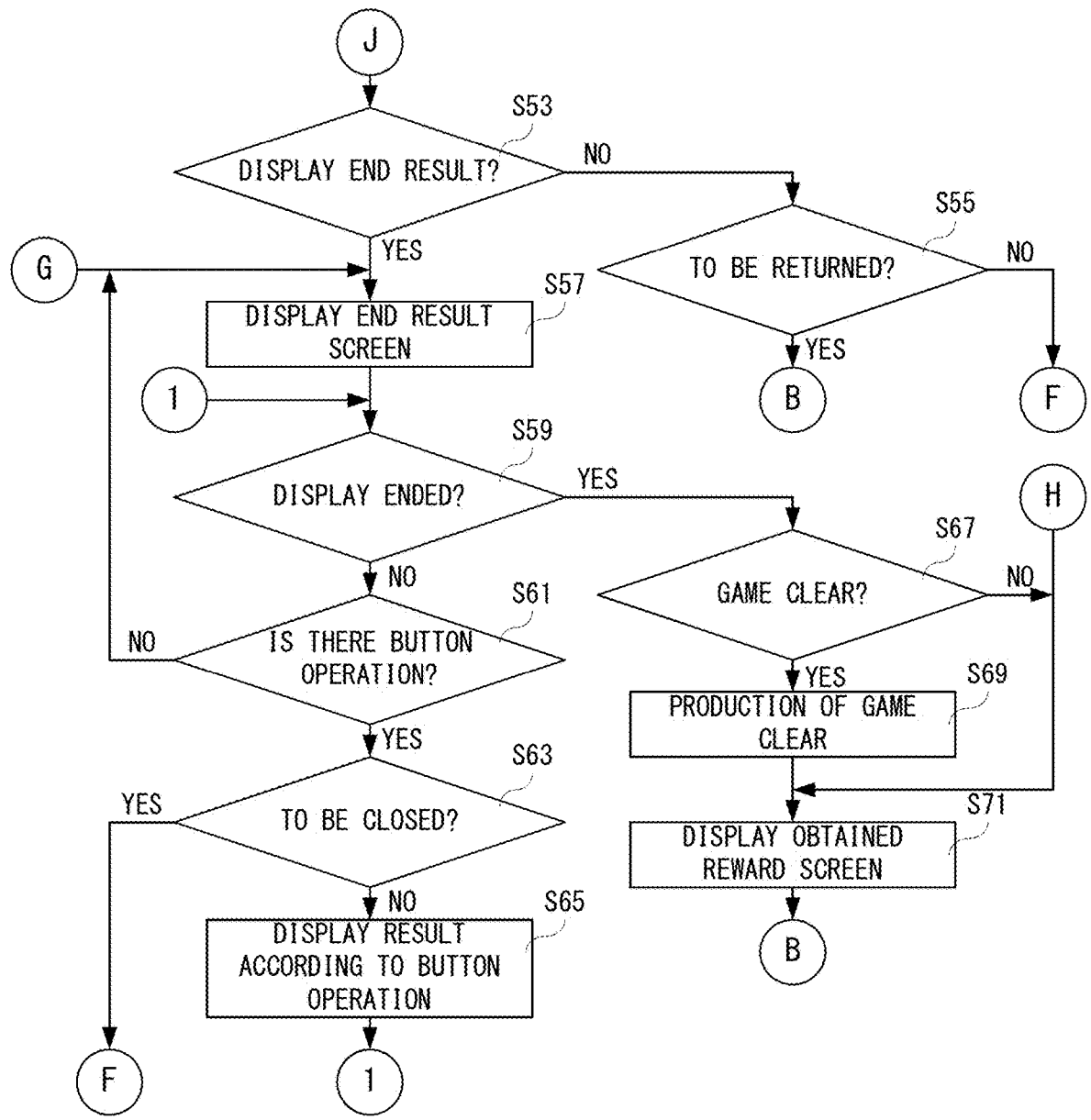
FIG. 17 is a flow chart showing a fourth part of the non-limiting example overall game processing of the CPU incorporated in the game apparatus shown in FIG. 2, following FIG. 16.

If "YES" is determined in the step S37, that is, if there is the battle, the process proceeds to a step S57 shown in FIG. 17. On the other hand, if "NO" is determined in the step S37, that is, if there is no battle, the process proceeds to a step S71 shown in FIG. 17.

Moreover, if "NO" is determined in the step S33, that is, if there is no instruction to turn back, it is determined, in a step S39, whether the halfway result is to be displayed. Here, the CPU 20 determines whether the button for displaying the halfway result (in FIG. 7, button 102*c*) provided beside the turning back button (in FIG. 7, button 102*b*) is turned on in the top menu screen 100*a* as shown in FIG. 7.

If "NO" is determined in the step S39, that is, if the halfway result is not to be displayed, the process proceeds to a step S53 shown in FIG. 17. On the other hand, if "YES" is determined in the step S39, that is, if the halfway result is to be displayed, the halfway result screen 300 as shown in FIG. 8 is displayed on the display 36 in a step S41. In the step S41, the CPU 20 generates the game image data of the halfway result screen 300 with using the image generation data 504c and referring to the player data 504d, the enemy character data 504e and the result data of the game processing by the side of the server 12 acquired from the server 12, and outputs the generated game image data to the display 36. The same applies to a case where the last time result screen 250 or the end result screen 400 is to be displayed on the display 36.

In a next step S43, it is determined whether there is any button operation. That is, it is determined whether any one of buttons 302a, 302b and 302d and the button 308 is turned on. If "NO" is determined in the step S43, that is, if there is no button operation, it is determined, in a step S45, whether the number of the turns of the battle result that is being displayed is the predetermined number of the turns (in this embodiment, second turn, third turn, fifth turn or sixth turn). If "NO" is determined in the step S45, that is, if the number of the turns of the battle result that is being displayed is not the predetermined number of the turns, the process returns to the step S41.

On the other hand, if "YES" is determined in the step S45, that is, the number of the turns of the battle result that is being displayed is the predetermined number of the turns, after displaying the enemy character identification screen 350 as shown in FIG. 9 on the display 36 for the second predetermined time period in a step S47, the process returns to the step S41. However, when executing the processing in the step S47, the CPU 20 selects at random the enemy character to be identified out of the plurality of enemy characters not having been identified. However, when the number of the enemy characters not having been identified is one (1), the enemy character concerned is identified.

Moreover, if "YES" is determined in the step S43, that is, if there is a button operation, it is determined, in a step S49, whether the display of the result is to be closed. That is, it is determined whether the button 308 is turned on. If "NO" is determined in the step S49, that is, if the display of the result is not to be closed, the process returns to the step S43 after displaying the result corresponding to the button operation. In the step S51, the battle result of the first turn, the battle result of the second turn, or the total result is displayed according to an operation of any one of the buttons 302a, 302b and 302d. On the other hand, if "YES" is determined in the step S49, that is, it the display of the result is to be closed, the process returns to the step S17 shown in FIG. 15.

As described above, if "NO" is determined in the step S39, it is determined, in the step S53 shown in FIG. 17, whether the end result is to be displayed. Here, the CPU 20 determines whether the turning back button (in FIG. 10, button 102d) is turned on in the top menu screen 100b as shown in FIG. 10.

If "NO" is determined in the step S53, that is, if the end result is not to be displayed, it is determined, in a step S55, whether the display is to be returned. If "YES" is determined in the step S55, that is, if the display is to be returned, the process returns to the step S3 shown in FIG. 14. On the other hand, if "NO" is determined in the step S55, that is, if the display is not to be returned, the process returns to the step S17 shown in FIG. 15.

On the other hand, if "YES" is determined in the step S53, that is, if the end result is to be displayed, the end result screen 400 as shown in FIG. 11 is displayed on the display 36 in the step S57, and it is determined, in a step S59, whether the display is ended. That is, the CPU 20 determines whether the total result is displayed in the end result screen 400.

If "NO" is determined in the step S59, that is, if the display is not ended, it is determined, in a step S61, whether there is any button operation. That is, it is determined whether any one of the buttons 402a-402d and the button 408 is turned on.

If "NO" is determined in the step S61, that is, if there is no button operation, the process returns to the step S57. On the other hand, if "YES" is determined in the step S61, that is, if there is a button operation, it is determined, in a step S63, whether the display is to be closed. That is, it is determined whether the button 408 is turned on.

If "NO" is determined in the step S63, that is, if the display is not to be closed, the result corresponding to the button operation is displayed in a step S65, and the process returns to the step S59. In response to an operation of any one of the buttons 402a, 402b, 402c and 402d, in a step S65, the battle result of the first turn, the battle result of the second turn, the battle result of the third turn or the total result is displayed. On the other hand, if "YES" is determined in the step S63, that is, if the display is to be closed, the process returns to the step S17 shown in FIG. 15.

In addition, as described above, in a case where the available character or the player can obtain the reward even if the hit point values of all the four available characters become 0 (zero), if "YES" is determined in the step S63, the process proceeds to a step S71.

Moreover, if "YES" is determined in the step S59, that is, if the display is to be ended, it is determined, in a step S67, whether it is a game clear. If "NO" is determined in the step S67, that is, if it is not a game clear, the obtained reward screen 450 as shown in FIG. 12 is displayed on the display 36 in the step S71, and the process returns to the step S3. On the other hand, if "YES" is determined in the step S67, the game clear is produced in a step S69, and the process proceeds to the step S71. For example, a screen (or telop) indicating that the game is cleared is displayed in the step S69.

In addition, although illustration is omitted, if it is not a game clear, it is determined whether it is a game over, and when it is a game over, the process returns to the step S3 after notifying by a message or an image that it is a game over. On the other hand, if it is not a game over, the process proceeds to the step S71.

In this embodiment, in a case of a game clear or a game over, the display returns to the top menu screen 100 irrespective of the elapse of the operation time, and therefore, there is no wasted time such as a time waiting for the elapse of the operation time.

As described above, if "YES" is determined in the step S23 of FIG. 15, the available character setting screen 200 as shown in FIG. 5 is displayed on the display 36 in the step S73, and it is determined, in a step S75, whether the available character is to be set (or re-set). As described above, in the step S73, the CPU 20 generates the game image data of the setting screen 200 with using the image generation data 504c and referring to the player data 504d, and outputs the generated game image data to the display 36.

If "YES" is determined in the step S75, that is, if the available character is set (or re-set), the set (or re-set) available character is stored in the RAM 22. That is, the CPU 20 updates the available character data 512 in the step S77. Then, the player data 504d is saved in a step S79, and the process returns to the step S73.

On the other hand, if "NO" is determined in the step S75, that is, if the available character is not set (or re-set), it is determined, in a step S81, the display is to be returned. Here, the CPU 20 determines whether the button 210 is turned on.

If "YES" is determined in the step S81, that is, if the display is to be returned, the process returns to the step S21 shown in FIG. 15. On the other hand, if "NO" is determined in the step S81, that is, if the display is not to be returned, it is determined, in a step S83, the last time result is to be displayed. That is, it is determined whether the button 208 is turned on.

If "NO" is determined in the step S83, that is, if the last time result is not to be displayed, the process returns to the step S73. On the other hand, if "YES" is determined in the step S83, that is, if the last time result is to be displayed, the last time result screen 250 as shown in FIG. 6 is displayed on the display 36 in a step S85.

Subsequently, in a step S87, it is determined whether there is any button operation. That is, it is determined whether any one of the buttons 252a-252d and the button 258 is turned on.

If "NO" is determined in the step S87, that is, if there is no button operation, the process returns to the step S85. On the other hand, if "YES" is determined in the step S87, that is, if there is a button operation, it is determined, in a step S89, whether the display is to be closed. That is, it is determined whether the button 258 is turned on. If "NO" is determined in the step S89, that is, if the display is not to be closed, the result according to the button operation is displayed in a step S91, and then, the process returns to the step S87. In the step S91, the battle result of the first turn, the battle result of the second turn, the battle result of the third turn or the total result in the last time individual game is displayed according to an operation of any one of the buttons 252a, 252b, 252c and 252d. On the other hand, if "YES" is determined in the step S89, that is, if the display is to be closed, the process returns to the step S73.

According to this embodiment, it is possible to know the halfway result of the individual game that is an auto-play game, and to change the strategy by setting the available character and/or setting the arrangement of the available characters according to the halfway result, i.e., by re-setting the available characters, and therefore, it is possible to improve the interest and the strategic property compared with simply obtaining the result of the auto-play.

In addition, in this embodiment, although the information of the game apparatus or player, and the player data are managed in the server, and the authentication processing is executed using the managed information and data at the time of a start of the virtual game data, it does not need to be limited to this. It is conceivable that the server receives the operation data from the game apparatus and executes the overall game processing partly or wholly, and then, sends a processing result to the game apparatus. In such a case, the player data may be downloaded from the server rather than saving in the game apparatus. Moreover, the server may be omitted so that a virtual game can be played in the game apparatus alone.

Moreover, in this embodiment, although the server executes the game processing of the individual game by the side of the server, the game processing of the individual game by the side of the server may be executed by the game apparatus by using the game apparatus alone.

Furthermore, in the individual game of this embodiment, four available characters and four enemy characters play battles one on one, but it does not need to be limited to this. There is no need to be limited to four available characters and four enemy characters as long as using one or more available characters and enemy characters, respectively. Moreover, the number of the available characters and the number of the enemy characters may be different from each other.

Furthermore, although the last time result screen shows, in this embodiment, the result from the start to the end when executing the individual game at the last time, it does not need to be limited to this. It is conceivable that only the result of the last time turn or all the results until the last time turn are displayed.

Moreover, although the hint regarding the attribute etc. of the enemy character is presented to the player in this embodiment, information such as the attribute of the enemy character may be simply disclosed as the individual game progresses while no hint is presented.

Furthermore, although the attribute of the enemy character is revealed in the predetermined number of the turns or when losing the battle in this embodiment, it does not need to be limited to this. According to the attribute of the available character, the attribute of the enemy character that plays a battle with this available character may be revealed. For example, in a case of the available character of a ninja (dark instrument), the attribute of the enemy character is revealed with probability of 100%.

Furthermore, in this embodiment, although the animation of the battle result is reproduced in the last time result screen, the halfway result screen and the end result screen, instead of reproduction of animation or in addition to reproduction of animation, a text describing the battle result may be shown. For example, it may be possible to display by the text, "The available character X applied 20 (twenty) damages to the enemy character Y".

Furthermore, although the display is transited to the last time result screen from the available character setting screen in this embodiment, the display may be transited from the strategy confirmation screen. Otherwise, the display is transited to the last time result screen from both of the available character setting screen and the strategy confirmation screen.

Furthermore, although the available character returns to the departure place in this embodiment, may return to another place. Specifically, the available character heads from the point A to the point B, and plays the battle with the enemy character, returns to the point C after the player see the halfway result, and heads the point B again to play the battle with the enemy character after the situation is changed to a situation that is advantageous for the available character or the available character is re-set by the player. For example, such a case where a base moves in the virtual space such that the available character departs from a virtual aircraft carrier and returns to the moved aircraft carrier corresponds.

Moreover, although each of the available characters and each of the enemy characters become an offense side or a defense side once in one turn so as to play the battle against each other in this embodiment, it does not need to be limited to this.

Furthermore, it becomes a game clear when all the four enemy characters lose in this embodiment, but it does not need to be limited to this. When all the four enemy characters lose, one or more reinforcing enemy characters may be set as an opponent so as to make play the battle with the available character. When all the four available characters lose, one or more reinforcing available characters may be set by the player so as to make play the battle with the enemy character.

Furthermore, the available character and the enemy character form a one-on-one group, and the both in each group play the battle with each other in this embodiment, it does not need to be limited to this. A plurality of available characters and a plurality of enemy characters are lined in a line, and may play tournament battles in an order from the beginning.

Moreover, although this embodiment is described on the individual game in which the available characters and the enemy characters attack mutually in the group of one-on-one, it does not need to be limited to this. The embodiment is applicable to other games such as a racing game in which vehicle objects compete for distances traveled, or a building game in which players compete in speeds of building a predetermined building (model). In the racing game, game processing is executed based on elapsed time, and affinity between attributes of the player character and the vehicle object used by the player character and attributes of the enemy character and the vehicle object used by the enemy character. In the building game, game processing is executed based on elapsed time, and affinity between attributes of the player character and the tools used by the player character and attributes of the enemy character and the tools used by the enemy character.

Moreover, although this embodiment is described in relation to a game that plays a battle with an enemy character, it does not need to be limited to this.

In another embodiment, the game may be a game aiming to make couples going out on dates by all groups or a predetermined number of groups by a plurality of characters appearing in the game by identifying attributes such as favorite hobbies and favorite foods of two characters who love one to one.

In another embodiment, the game may be a game in which the player loads a plurality of products on a virtual food stall, and based on the product (corresponding to an attribute) sold at another food stall in a virtual street food and the sales thereof, etc., the number of the customers, the sales and the inventory are confirmed, and the supply and the change of the products are determined to compete for the sales in a predetermined time period.

Moreover, the content of game, the configuration of the game apparatus and specific numeral values shown in this embodiment are mere examples and can be appropriately changed according to actual products.

Furthermore, as long as the same effect (result) is obtained, the order of respective steps shown in the flow charts may be appropriately changed.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer readable storage medium storing an information processing program that is executable by a computer comprising one or mom processors, wherein the information processing program comprises instructions configured to cause the one or more processors to perform operations comprising:

setting at least a first character as an active character to be used in an event where an enemy character appears, wherein the first character is from a plurality of characters that are selectable for use by a user in the event;

starting the event in a state where at least a part of an attribute of the enemy character is not revealed, on a display screen, to the user;

automatically executing the event based on at least time elapse and an affinity between an attribute of the active character and the attribute of the enemy character;

presenting, based on the execution of the event, a progress state of the event to the user after starting the event;

automatically revealing, based on the progress state of the event, the part of the attribute that was previously not revealed on the display screen; and swapping, for the active character and before completion of the event, the first character for a second character of the plurality of characters.

2. The storage medium according to the claim 1, wherein the operations further comprise presenting to the user a hint concerning the attribute of the enemy character appearing in the event before starting the event, and the first character to be used in the event is set based on a user operation.

3. The storage medium according to the claim 1, wherein the operations further comprise stopping progress of the event when a request by the user occurs or when a predetermined time period elapses after starting the event.

4. The storage medium according to the claim 3, wherein operations further comprise starting the event from a progress state of the event concerning the enemy character at a time point of stopping the event when the event is started after a stop.

5. The storage medium according to the claim 3, wherein the operations further comprise executing a clear event concerning a clear of the event at the time point of stopping when the progress state of the event at the time point of a stop satisfies a clear condition.

6. The storage medium according to the claim 3, wherein hit point values are set for the active character and the enemy character, and the hit point values being updated according to the progress of the event; and operations further comprise ending the progress of the event when a first condition concerning the hit point value of the active character is satisfied or when a second condition concerning the hit point value of the enemy character is satisfied.

7. The storage medium according to the claim 1, wherein the active character is multiple activate characters and the enemy character is a plurality of enemy characters, and the operations further comprise determining a plurality of groups by selecting respective opponents for the multiple activate characters from a plurality of enemy characters, whereby the event is proceeded based on an affinity between an attribute of the enemy character and an attribute of the active character for each group having been determined.

8. The storage medium according to the claim 7, wherein the operations further comprise disclosing the attribute of each of the plurality of enemy characters stepwisely according to the progress state of the event.

9. The storage medium according to the claim 7, wherein the plurality of groups are automatically determined immediately after a start of the event.

10. The storage medium according to the claim 9, wherein the plurality of groups are determined so that a total amount of damages given to the enemy characters by the active character becomes the largest.

11. The storage medium according to the claim 7, wherein a sequential order is set for each of the multiple active characters based on a user operation, and the operations further comprise determining the plurality of groups based on the sequential order set to each of the multiple active characters.

12. The storage medium according to the claim 1, wherein the progress state of the event includes a remaining number of the enemy characters and/or hit point values, the remaining number of the enemy characters and/or the hit point values are decreased according to time elapse, and the remaining number of the enemy characters and/or the hit point values are presented to the user.

13. The non-transitory computer readable storage medium of claim 1, wherein over the course of the automatically executing event, multiple different previously non-revealed aspects of the enemy character are sequentially revealed for the enemy character based on the progress state of the event, with each of the sequentially revealed aspects based on a different point during the event.

14. The non-transitory computer readable storage medium of claim 1, wherein over the course of the automatically executing event, multiple different previously non-revealed aspects of the enemy character are gradually revealed for the enemy character based on the progress state of the event.

15. The non-transitory computer readable storage medium of claim 1, wherein the progress state is based on a number of turns taken during the event.

16. An information processing apparatus comprising:
one or more processors that are configured to execute computer executable instructions that cause the one or more processors to perform operations including:
setting at least a first character as an active character to be used in an event where an enemy character appears, wherein the first character from a plurality of characters that are selectable for use by a user in the event;
starting the event in a state where at least a part of an attribute of the enemy character is not revealed, on a display screen, to the user;
automatically executing the event based on at least time elapse and an affinity between an attribute of the active character and the attribute of the enemy character;
presenting, based on the execution of the event, a progress state of the event to the user after starting the event;
automatically revealing, based on the progress state of the event, the part of the attribute that was previously not revealed on the display screen; and
swapping, for the active character and before completion of the event, the first character for a second character of the plurality of characters.

17. An information processing system comprising:
one or more processors configured to execute computer executable instructions that cause the one or more processors to perform operations including:
setting at least a first character as an active character to be used in an event where an enemy character appears, wherein the first character is from a plurality of characters that are selectable for use by a user in the event;
starting the event in a state where at least a part of an attribute of the enemy character is not revealed, on a display screen, to the user;
automatically executing the event based on at least time elapse and an affinity between an attribute of the active character and the attribute of the enemy character;
presenting, based on the execution of the event, a progress state of the event to the user after starting the event;
automatically revealing, based on the progress state of the event, the part of the attribute that was previously not revealed on the display screen; and
swapping, for the active character and before completion of the event, the first character for a second character of the plurality of characters.

18. An information processing method, comprising:
setting at least a first character as an active character to be used in an event where an enemy character appears, wherein the first character is from a plurality of characters that are selectable for use by a user in the event;
starting the event in a state where at least a part of an attribute of the enemy character is not revealed, on a display screen, to the user;
automatically executing the event based on at least time elapse and an affinity between an attribute of the active character and the attribute of the enemy character;
presenting, based on the execution of the event, a progress state of the event to the user after starting the event;
automatically revealing, based on the progress state of the event, the part of the attribute that was previously not revealed on the display screen; and swap, for the active character and before completion of the event, the first character for the second character; and
swapping, for the active character and before completion of the event, the first character for a second character of the plurality of characters.

* * * * *